United States Patent
Youn et al.

(10) Patent No.: US 12,490,219 B2
(45) Date of Patent: Dec. 2, 2025

(54) COMMUNICATION RELATED TO LOCALIZED SERVICE

(71) Applicant: LG ELECTRONICS INC., Seoul (KR)

(72) Inventors: Myungjune Youn, Seoul (KR); Hyunsook Kim, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 405 days.

(21) Appl. No.: 18/059,769

(22) Filed: Nov. 29, 2022

(65) Prior Publication Data

US 2023/0309045 A1   Sep. 28, 2023

Related U.S. Application Data

(60) Provisional application No. 63/337,175, filed on May 2, 2022, provisional application No. 63/322,649, filed on Mar. 23, 2022.

(51) Int. Cl.
*H04W 60/04* (2009.01)
*H04W 76/10* (2018.01)

(52) U.S. Cl.
CPC ........... *H04W 60/04* (2013.01); *H04W 76/10* (2018.02)

(58) Field of Classification Search
CPC .............................. H04W 60/04; H04W 76/10
USPC ........................................................ 370/329
See application file for complete search history.

(56) References Cited

U.S. PATENT DOCUMENTS

| | | | | |
|---|---|---|---|---|
| 2024/0008127 | A1* | 1/2024 | Kanneath Abraham | H04W 4/60 |
| 2024/0048986 | A1* | 2/2024 | Liu | H04W 76/12 |
| 2024/0236910 | A1* | 7/2024 | Tiwari | H04W 60/04 |
| 2025/0016041 | A1* | 1/2025 | Wang | H04L 41/0661 |
| 2025/0039695 | A1* | 1/2025 | Suh | H04W 12/06 |
| 2025/0039820 | A1* | 1/2025 | Tiwari | H04W 48/18 |

FOREIGN PATENT DOCUMENTS

EP          3592008         1/2020

OTHER PUBLICATIONS

3GPP TS23.502, 3rd Generation Partnership Project; Technical Specification Group Services and System Aspects; Procedures for the 5G System (5GS); Stage 2 (Release 16), TS 23.502, V16.3.0, Dec. 2019 (Year: 2019).*
3rd Generation Partnership Project; Technical Specification Group Services and System Aspects; Procedures for the 5G System (5GS); Stage 2 (Release 16), 3GPP TS 23.502 V16.3.0, Dec. 2019, 558 pages.

(Continued)

*Primary Examiner* — Christopher B Robinson
*Assistant Examiner* — Chong G Kim
(74) *Attorney, Agent, or Firm* — LEE, HONG, DEGERMAN, KANG & WAIMEY

(57) ABSTRACT

One disclosure of the present specification provides a method for a UE to perform communication. The method includes transmitting a NAS request message to a first AMF; receiving a NAS response message from the first AMF; transmitting a registration request message to a second AMF; and receiving a registration acceptance message including LADN information from the second AMF.

9 Claims, 18 Drawing Sheets

(56) References Cited

OTHER PUBLICATIONS

Technical Specification; "5G; Policy and charging control framework for the 5G System (5GS); Stage 2," 3GPP TS 23.503 version 16.10.0, Release 16, Sep. 2021, 122 pages.
European Patent Office Application Serial No. 22209195.1, Search Report dated Aug. 3, 2023, 9 pages.
3rd Generation Partnership Project, "Technical Specification Group Services and System Aspects; Procedures for the 5G System (5GS); Stage 2 (Release 16)," XP002803444, Header 3GPP TS 23.502 V16.4.0, Mar. 2020, 584 pages.

* cited by examiner

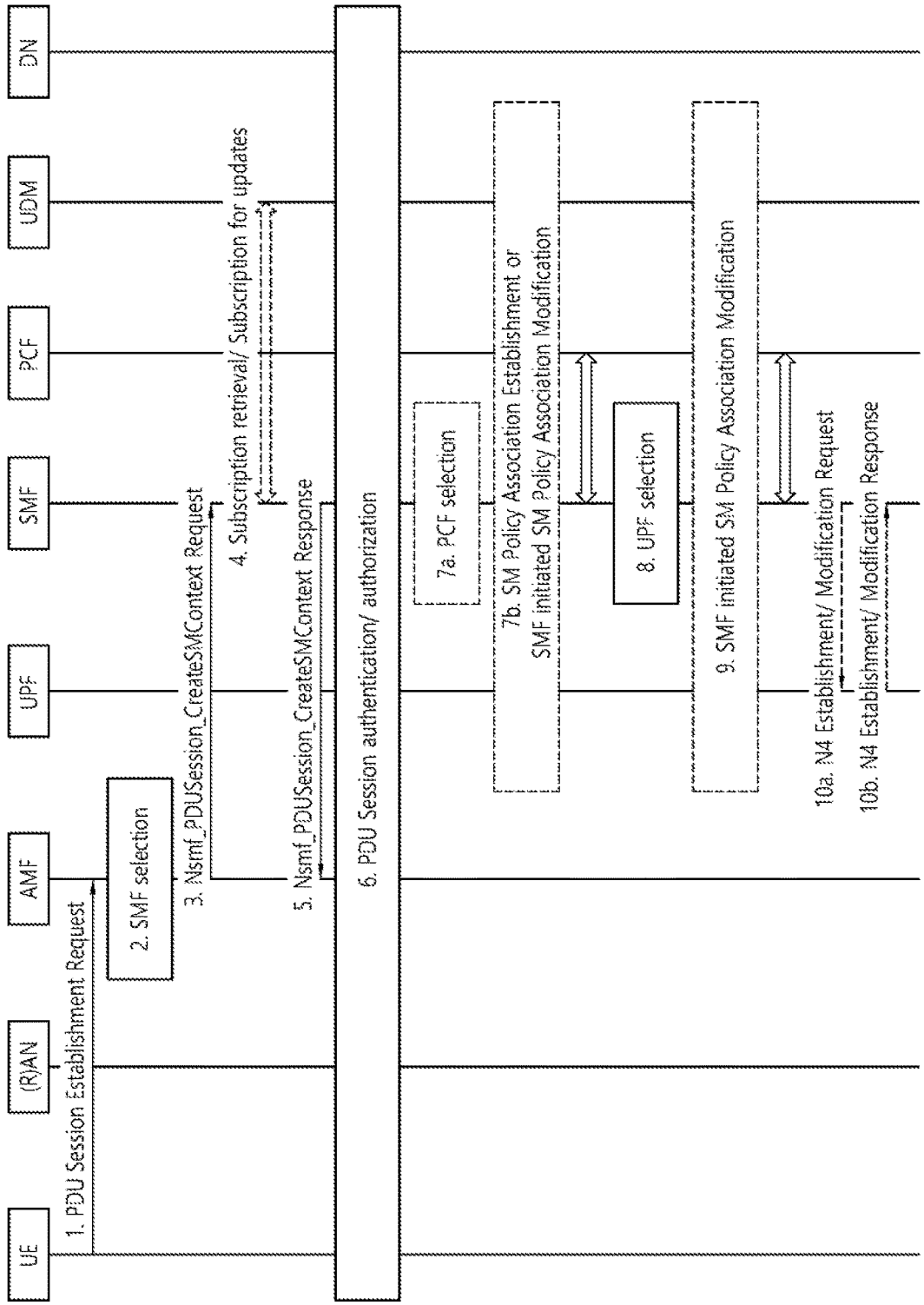

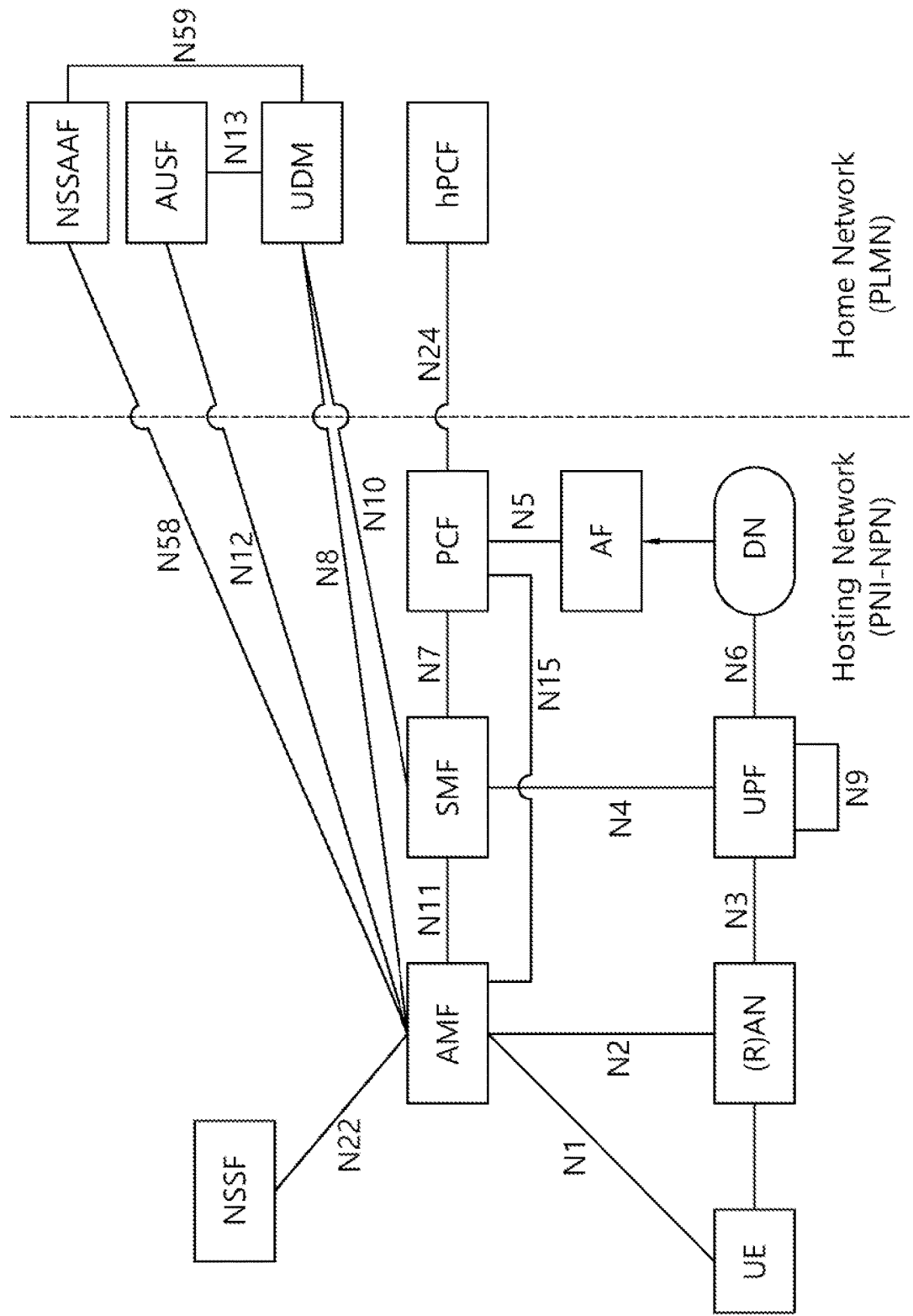

COMMUNICATION RELATED TO LOCALIZED SERVICE

CROSS-REFERENCE TO RELATED APPLICATIONS

Pursuant to 35 U.S.C. § 119(e), this application claims the benefit of U.S. Provisional Patent Application Nos. 63/322,649, filed on Mar. 23, 2022, and 63/337,175, filed on May 2, 2022, the contents of which are all hereby incorporated by reference herein in their entireties.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In NR, NPN (Non-Public Network) was introduced.

In order to use the NPN, the terminal may be provided with an NPN-related service after performing a procedure for subscribing to the NPN. However, actually, considering the NPN-related service environment, the UE may need to be provided with the NPN-related service immediately without a procedure for subscribing to the NPN. For example, the terminal may need to be able to receive a service immediately without performing a procedure for subscribing to a separate NPN while being subscribed to the public land mobile network (PLMN).

For example, when a terminal subscribed to PLMN stays in a specific area (e.g. building, stadium, parking lot, etc.), it should be able to easily receive NPN-related services provided in the corresponding area. However, in the prior art, since the terminal has to perform a procedure for subscribing to the NPN, the terminal subscribing to the PLMN cannot easily receive the NPN related service.

SUMMARY

Accordingly, a disclosure of the present specification has been made in an effort to solve the aforementioned problem.

One disclosure of the present specification may support the UE to obtain information on the localized service from the AMF of the serving network. One disclosure of the present specification may support the terminal to perform communication with the AMF of the hosting network and to obtain LADN information based on the information on the localized service.

According to the disclosure of the present specification, it is possible to solve the problems of the related art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIGS. 7a and 7b show an example of a PDU session establishment procedure to which the implementation of the present specification is applied.

FIG. 8 shows an example architecture when a UE uses a localized service provided by a hosting network.

DETAILED DESCRIPTION

Figure 1:
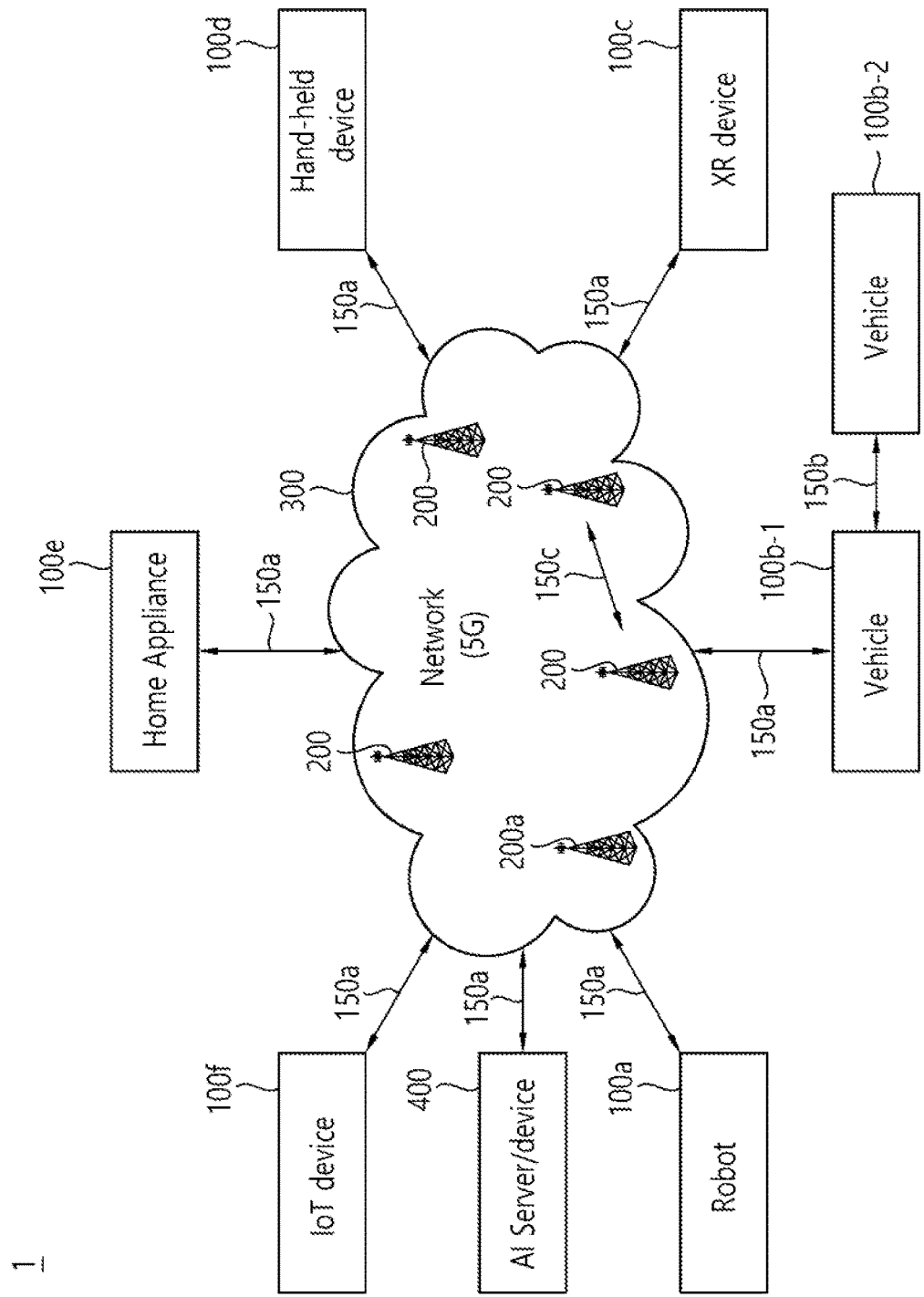
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the attached drawings, user equipments (UEs) are shown for example. The UE may also be denoted a terminal or mobile equipment (ME). In addition, the UE may be a laptop computer, a mobile phone, a PDA, a smartphone, a multimedia device, or other portable device, or may be a stationary device such as a PC or a car mounted device.

Hereinafter, the UE is used as an example of a wireless communication device (or a wireless apparatus, or a wireless device) capable of wireless communication. An operation performed by the UE may be performed by a wireless communication device. A wireless communication device may also be referred to as a wireless apparatus, a wireless device, or the like. Hereinafter, AMF may mean an AMF node, SMF may mean an SMF node, and UPF may mean a UPF node.

The term "base station" used hereinafter generally refers to a fixed station that communicates with a wireless device and may be denoted by other terms such as evolved-NodeB (eNodeB), evolved-NodeB (eNB), Base Transceiver System (BTS), access point, or Next generation NodeB (gNB).

I. Techniques and Procedures Applicable to the Disclosure of the Present Specification FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

Here, the radio communication technologies implemented in the wireless devices in the present disclosure may include narrowband Internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
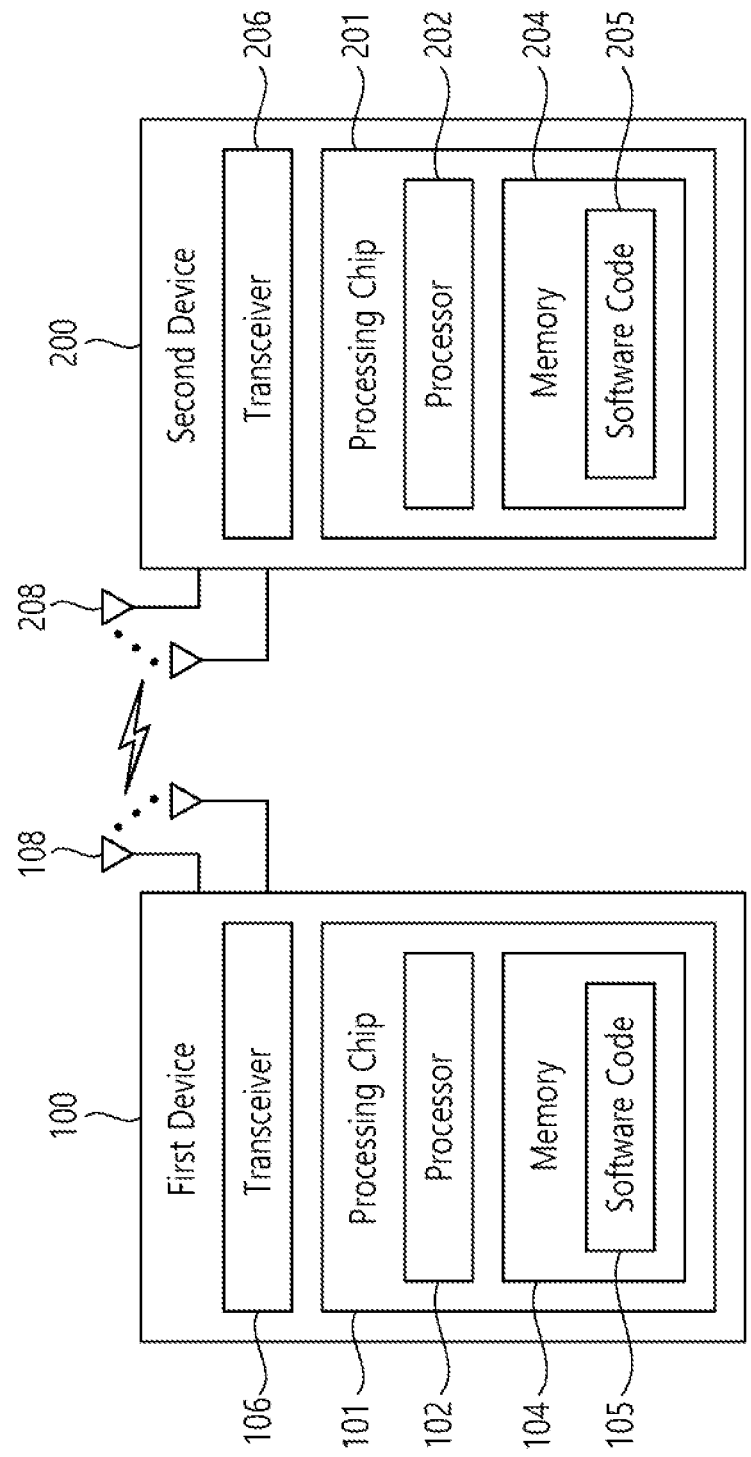
FIG. 2 shows an example of a wireless device to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) or packet data unit (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
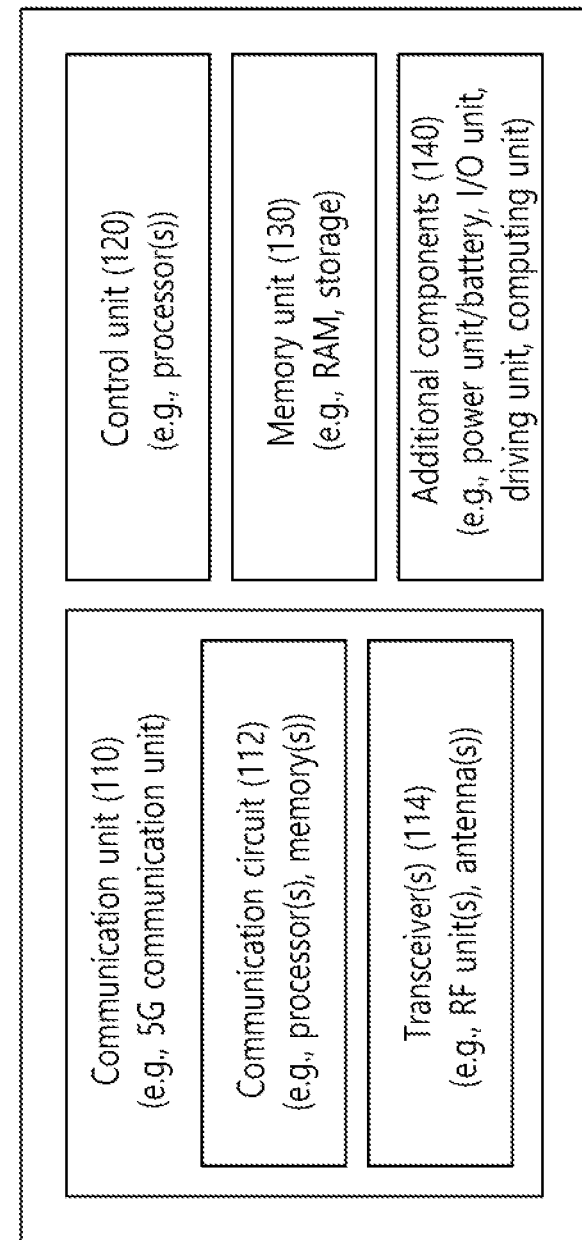
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
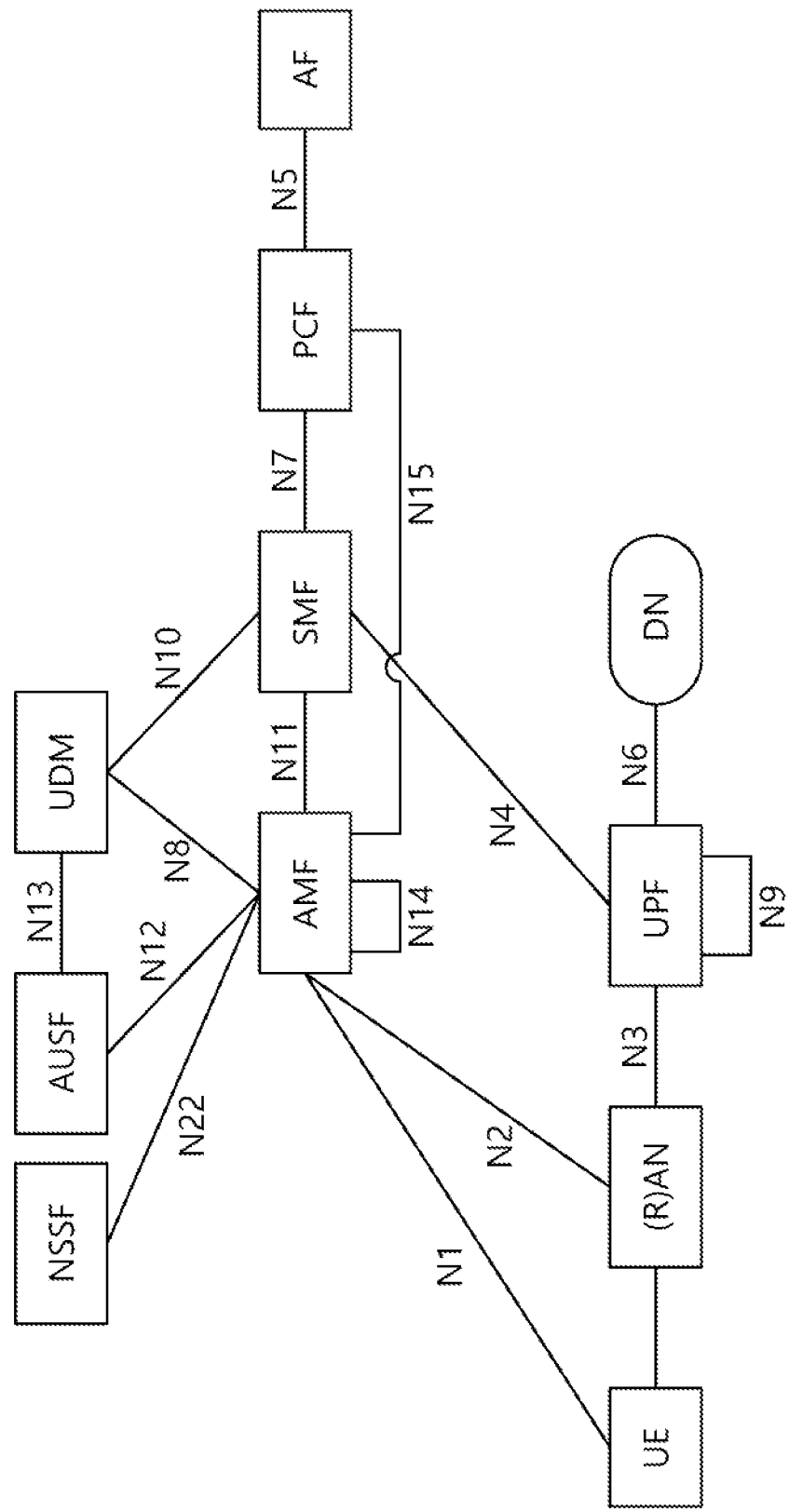
FIG. 4 shows an example of a 5G system architecture to which the implementation of the present specification is applied.

FIG. 4 shows an example of a 5G system architecture to which the implementation of the present specification is applied.

The 5G system (5GS; 5G system) structure consists of the following network functions (NFs).

AUSF (Authentication Server Function)
AMF (Access and Mobility Management Function)
DN (Data Network), e.g. operator services, internet access or third-party services USDF (Unstructured Data Storage Function)
NEF (Network Exposure Function)
I-NEF (Intermediate NEF)
NRF (Network Repository Function)
NSSF (Network Slice Selection Function)
PCF (Policy Control Function)
SMF (Session Management Function)
UDM (Unified Data Management)
UDR (Unified Data Repository)
UPF (User Plane Function)
UCMF (UE radio Capability Management Function)
AF (Application Function)
UE (User Equipment)
(R)AN ((Radio) Access Network)
5G-EIR (5G-Equipment Identity Register)
NWDAF (Network Data Analytics Function)
CHF (Charging Function)

In addition, the following network functions may be considered.

N3IWF (Non-3GPP InterWorking Function)
TNGF (Trusted Non-3GPP Gateway Function)
W-AGF (Wireline Access Gateway Function)

FIG. 4 shows the 5G system structure of a non-roaming case using a reference point representation that shows how various network functions interact with each other.

In FIG. 4, UDSF, NEF and NRF are not described for clarity of the point-to-point diagram. However, all network functions shown can interact with UDSF, UDR, NEF and NRF as needed.

For clarity, the connection between the UDR and other NFs (e.g. PCFs) is not shown in FIG. 4. For clarity, the connection between NWDAF and other NFs (e.g. PCFs) is not shown in FIG. 4.

The 5G system architecture includes the following reference points.

N1: the reference point between the UE and the AMF.
N2: the reference point between (R)AN and AMF.
N3: the reference point between (R)AN and UPF.
N4: the reference point between SMF and UPF.
N6: the reference point between UPF and data network.
N9: the reference point between two UPFs.

The following reference points show the interactions that exist between NF services in NF.

N5: the reference point between PCF and AF.
N7: the reference point between SMF and PCF.
N8: the reference point between UDM and AMF.
N10: the reference point between UDM and SMF.
N11: the reference point between AMF and SMF.
N12: the reference point between AMF and AUSF.
N13: the reference point between UDM and AUSF.
N14: the reference point between two AMFs.
N15: In the non-roaming scenario, indicates the reference point between the PCF and the AMF, in the roaming scenario, indicates the reference point between the AMF and the PCF of the visited network.
N16: the reference point between two SMFs (in case of roaming, between the SMF of the visited network and the SMF of the home network)
N22: the reference point between AMF and NSSF.
N30: the reference point between PCFk and NEF.
N33: the reference point between AF and NEF.

In some cases, it may be necessary to connect two NFs to each other to service the UE.

For reference, in FIG. 4, an AF by a third party other than an operator may be connected to 5GC through NEF.

Figure 5:
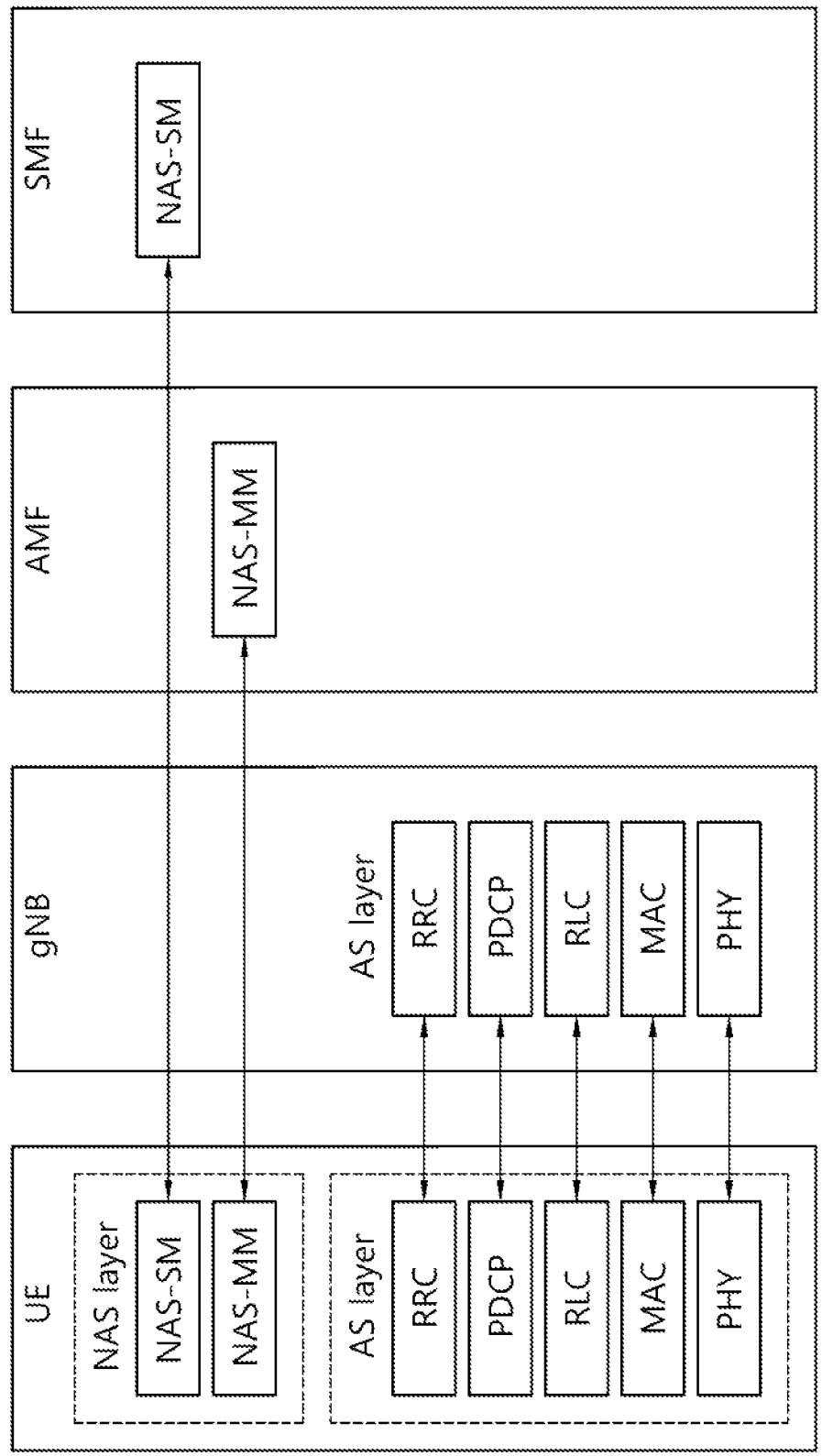
FIG. 5 is another exemplary diagram showing the structure of a radio interface protocol between the UE and the gNB.

FIG. 5 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
  NAS procedures related to AMF include the following.
  Registration management and access management procedures. AMF supports the following functions.
  Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
  The NAS entity for the MM creates a NAS-MM message that derives how and where to deliver an SM signaling message through a security header representing the NAS transmission of SM signaling and additional information on a received NAS-MM.
  Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, an AMF performs registration management (RM: Registration Management) and connection management (CM: Connection Management) for 3GPP access as well as non-3GPP access.

A Multi-Access (MA) PDU session using both a 3GPP access and a non-3GPP access may be used.

The MA PDU session is a PDU session that can be serviced simultaneously with 3GPP access and non-3GPP access using one PDU session.

<Registration Procedure>

A registration procedure is described. Section 4.2.2.2 of 3GPP TS 23.502 V16.3.0 (2019-12) can be referred.

Figure 6A:
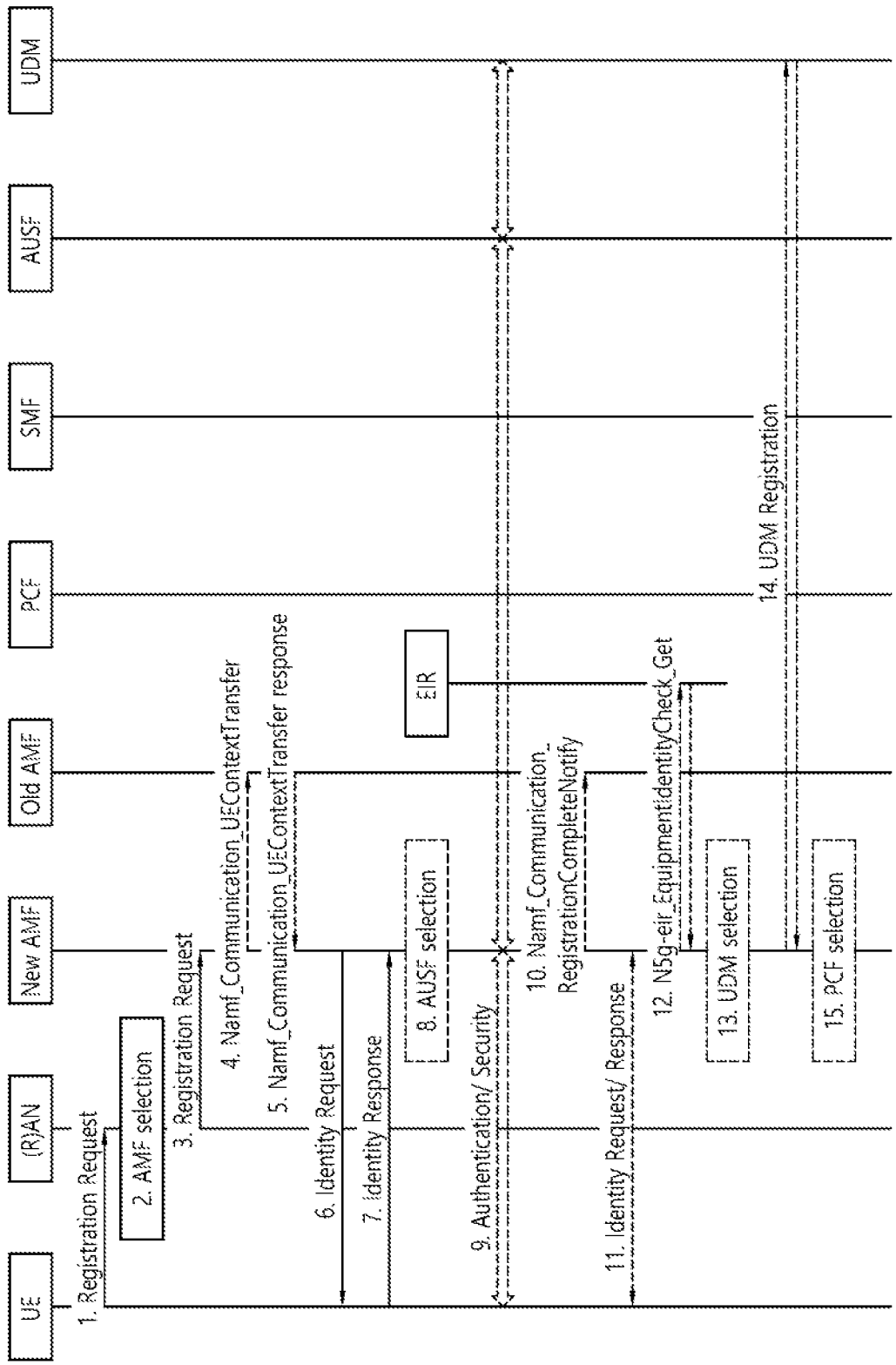
FIGS. 6a and 6b show examples of registration procedures to which implementations of the present specification are applied.
Figure 6B:
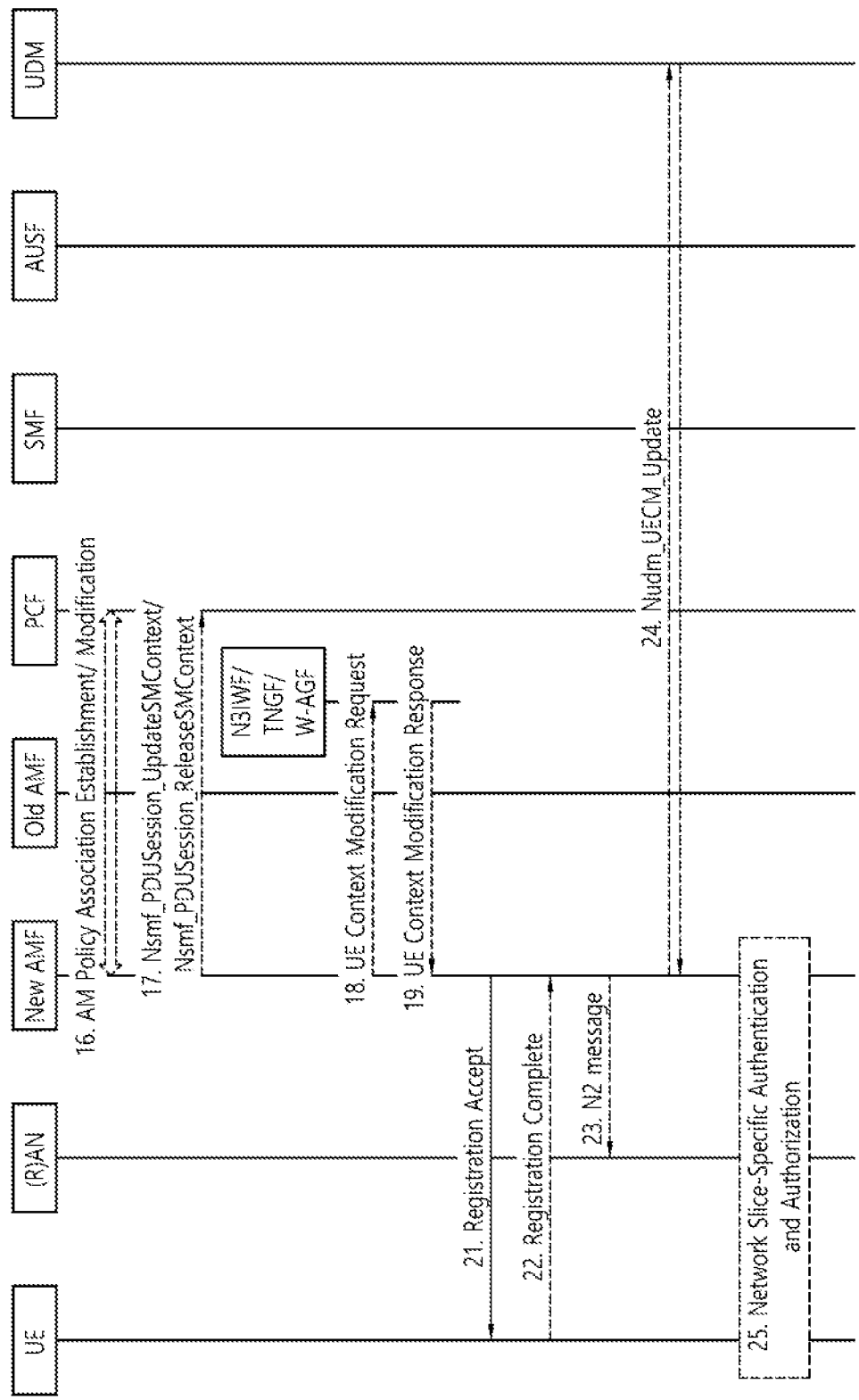

FIGS. 6a and 6b show an example of a registration procedure to which implementations of the present disclosure is applied.

A UE needs to register with the network to get authorized to receive services, to enable mobility tracking and to enable reachability. The UE initiates the registration procedure using one of the following registration types:

Initial registration to the 5GS; or
Mobility registration update; or
Periodic registration update; or
Emergency registration.

The general registration procedure in FIGS. 6a and 6b applies on all these registration procedures, but the periodic registration update need not include all parameters that are used in other registration cases.

The general registration procedure in FIGS. 6a and 6b is also used for the case of registration in 3GPP access when the UE is already registered in a non-3GPP access, and vice versa. Registration in 3GPP access when the UE is already registered in a non-3GPP access scenario may require an AMF change.

First, procedures of FIGS. 6a and 6b are described.

(1) Step 1: The UE transmits a Registration Request message to the (R)AN. The Registration Request message corresponds to AN message.

The Registration Request message may include AN parameters. In the case of NG-RAN, the AN parameters include, e.g., 5G SAE temporary mobile subscriber identity (5G-S-TMSI) or globally unique AMF ID (GUAMI), the selected public land mobile network (PLMN) ID (or PLMN ID and network identifier (NID)) and Requested network slice selection assistance information (NSSAI). The AN parameters also include establishment cause. The establishment cause provides the reason for requesting the establishment of an RRC connection. Whether and how the UE includes the Requested NSSAI as part of the AN parameters is dependent on the value of the access stratum connection establishment NSSAI inclusion mode parameter.

The Registration Request message may include a registration type. The registration type indicates if the UE wants to perform an initial registration (i.e., the UE is in RM-DEREGISTERED state), a mobility registration update (i.e., the UE is in RM-REGISTERED state and initiates a registration procedure due to mobility or due to the UE needs to update its capabilities or protocol parameters, or to request a change of the set of network slices it is allowed to use), a periodic registration update (i.e., the UE is in RM-REGISTERED state and initiates a registration procedure due to the periodic registration update timer expiry) or an emergency registration (i.e., the UE is in limited service state).

When the UE is performing an initial registration, the UE shall indicate its UE identity in the Registration Request message as follows, listed in decreasing order of preference:

i) a 5G globally unique temporary identifier (5G-GUTI) mapped from an evolved packet system (EPS) GUTI, if the UE has a valid EPS GUTI.

ii) a native 5G-GUTI assigned by the PLMN to which the UE is attempting to register, if available;

iii) a native 5G-GUTI assigned by an equivalent PLMN to the PLMN to which the UE is attempting to register, if available;

iv) a native 5G-GUTI assigned by any other PLMN, if available.

v) Otherwise, the UE shall include its subscriber concealed identifier (SUCI) in the Registration Request message.

When the UE performing an initial registration has both a valid EPS GUTI and a native 5G-GUTI, the UE shall also indicate the native 5G-GUTI as additional GUTI. If more than one native 5G-GUTIs are available, the UE shall select the 5G-GUTI in decreasing order of preference among items (ii)-(iv) in the list above.

When the UE is performing an initial registration with a native 5G-GUTI, then the UE shall indicate the related GUAMI information in the AN parameters. When the UE is performing an initial registration with its SUCI, the UE shall not indicate any GUAMI information in the AN parameters.

For an emergency registration, the SUCI shall be included if the UE does not have a valid 5G-GUTI available; the permanent equipment identifier (PEI) shall be included when the UE has no subscriber permanent identifier (SUPI) and no valid 5G-GUTI. In other cases, the 5G-GUTI is included and it indicates the last serving AMF.

The Registration Request message may also include security parameters, PDU Session Status, etc. The security parameters are used for authentication and integrity protection. The PDU Session Status indicates the previously established PDU sessions in the UE. When the UE is connected to the two AMFs belonging to different PLMN via 3GPP access and non-3GPP access then the PDU Session status indicates the established PDU Session of the current PLMN in the UE.

(2) Step 2: The (R)AN selects an AMF.

If a 5G-S-TMSI or GUAMI is not included or the 5G-S-TMSI or GUAMI does not indicate a valid AMF, the (R)AN, based on (R)AT and requested NSSAI, if available, selects an AMF.

If UE is in CM-CONNECTED state, the (R)AN can forward the Registration Request message to the AMF based on the N2 connection of the UE.

If the (R)AN cannot select an appropriate AMF, it forwards the Registration Request message to an AMF which has been configured, in the (R)AN, to perform AMF selection.

(3) Step 3: The (R)AN transmits a Registration Request message to the new AMF. The Registration Request message corresponds to N2 message.

The Registration Request message may include whole information and/or a part of information included in the Registration Request message received from the UE which is described in step 1.

The Registration Request message may include N2 parameters. When NG-RAN is used, the N2 parameters include the selected PLMN ID (or PLMN ID and NID), location information and cell identity related to the cell in which the UE is camping, UE context request which indicates that a UE context including security information needs to be setup at the NG-RAN. When NG-RAN is used, the N2 parameters shall also include the establishment cause.

If the Registration type indicated by the UE is Periodic Registration Update, then steps 4 to 19 may be omitted.

(4) Step 4: If the UE's 5G-GUTI was included in the Registration Request message and the serving AMF has changed since last registration procedure, the new AMF may invoke the Namf_Communication_UEContextTransfer service operation on the old AMF including the complete registration request non-access stratum (NAS) message to request the UE's SUPI and UE context.

(5) Step 5: The Old AMF may respond to the new AMF for the Namf_Communication_UEContextTransfer invocation by including the UE's SUPI and UE context.

(6) Step 6: If the SUCI is not provided by the UE nor retrieved from the old AMF, the identity request procedure may be initiated by the new AMF sending the Identity Request message to the UE requesting the SUCI.

(7) Step 7: The UE may respond with an Identity Response message including the SUCI. The UE derives the SUCI by using the provisioned public key of the home PLMN (HPLMN).

(8) Step 8: The new AMF may decide to initiate UE authentication by invoking an AUSF. In that case, the new AMF selects an AUSF based on SUPI or SUCI.

(9) Step 9: Authentication/security may be established by the UE, new AMF, AUSF and/or UDM.

(10) Step 10: If the AMF has changed, the new AMF may notify the old AMF that the registration of the UE in the new AMF is completed by invoking the Namf_Communication_RegistrationCompleteNotify service operation. If the authentication/security procedure fails, then the registration shall be rejected, and the new AMF may invoke the Namf_Communication_RegistrationCompleteNotify service operation with a reject indication reason code towards the old AMF. The old AMF may continue as if the UE context transfer service operation was never received.

(11) Step 11: If the PEI was not provided by the UE nor retrieved from the old AMF, the Identity Request procedure may be initiated by the new AMF sending an Identity Request message to the UE to retrieve the PEI. The PEI shall be transferred encrypted unless the UE performs emergency registration and cannot be authenticated.

(12) Step 12: Optionally, the new AMF may initiate ME identity check by invoking the N5g-eir_EquipmentIdentityCheck_Get service operation.

Now, procedures of FIGS. 6a and 6b, which follow the procedures of FIG. 6, are described.

(13) Step 13: If step 14 below is to be performed, the new AMF, based on the SUPI, may select a UDM, then UDM may select a UDR instance.

(14) Step 14: The new AMF may register with the UDM.

(15) Step 15: The new AMF may select a PCF.

(16) Step 16: The new AMF may optionally perform an AM Policy Association Establishment/Modification.

(17) Step 17: The new AMF may transmit Update/Release SM Context message (e.g., Nsmf_PDUSession_UpdateSM-Context and/or Nsmf_PDUSession_ReleaseSMContext) to the SMF.

(18) Step 18: If the new AMF and the old AMF are in the same PLMN, the new AMF may send a UE Context Modification Request to the N3IWF/TNGF/W-AGF.

(19) Step 19: The N3IWF/TNGF/W-AGF may send a UE Context Modification Response to the new AMF.

(20) Step 20: After the new AMF receives the response message from the N3IWF/TNGF/W-AGF in step 19, the new AMF may register with the UDM.

(21) Step 21: The new AMF transmits a Registration Accept message to the UE.

The new AMF sends a Registration Accept message to the UE indicating that the Registration Request has been accepted. 5G-GUTI is included if the new AMF allocates a new 5G-GUTI. If the UE is already in RM-REGISTERED state via another access in the same PLMN, the UE shall use the 5G-GUTI received in the Registration Accept message for both registrations. If no 5G-GUTI is included in the Registration Accept message, then the UE uses the 5G-GUTI assigned for the existing registration also for the new registration. If the new AMF allocates a new registration area, it shall send the registration area to the UE via Registration Accept message. If there is no registration area included in the Registration Accept message, the UE shall consider the old registration area as valid. Mobility Restrictions is included in case mobility restrictions applies for the UE and registration type is not emergency registration. The new AMF indicates the established PDU sessions to the UE in the PDU Session status. The UE removes locally any internal resources related to PDU sessions that are not marked as established in the received PDU Session status. When the UE is connected to the two AMFs belonging to different PLMN via 3GPP access and non-3GPP access then the UE removes locally any internal resources related to the PDU session of the current PLMN that are not marked as established in received PDU Session status. If the PDU Session status information was in the Registration Request message, the new AMF shall indicate the PDU Session status to the UE.

The Allowed NSSAI provided in the Registration Accept message is valid in the registration area and it applies for all the PLMNs which have their tracking areas included in the registration area. The Mapping Of Allowed NSSAI is the mapping of each S-NSSAI of the Allowed NSSAI to the HPLMN S-NSSAIs. The Mapping Of Configured NSSAI is the mapping of each S-NSSAI of the Configured NSSAI for the serving PLMN to the HPLMN S-NSSAIs.

Furthermore, optionally the new AMF performs a UE Policy Association Establishment.

(22) Step 22: The UE may send a Registration Complete message to the new AMF when it has successfully updated itself.

The UE may send a Registration Complete message to the new AMF to acknowledge if a new 5G-GUTI was assigned.

(23) Step 23: For registration over 3GPP Access, if the new AMF does not release the signaling connection, the new AMF may send the RRC Inactive Assistance Information to the NG-RAN. For registration over non-3GPP Access, if the UE is also in CM-CONNECTED state on 3GPP access, the new AMF may send the RRC Inactive Assistance Information to the NG-RAN.

(24) Step 24: The new AMF may perform information update towards the UDM.

(25) Step 25: The UE may execute Network Slice-Specific Authentication and Authorization procedure.

<PDU Session Establishment Procedure>

A PDU session establishment procedure is described. Section 4.3.2 of 3GPP TS 23.502 V16.3.0 (2019-12) can be referred.

Figure 7B:
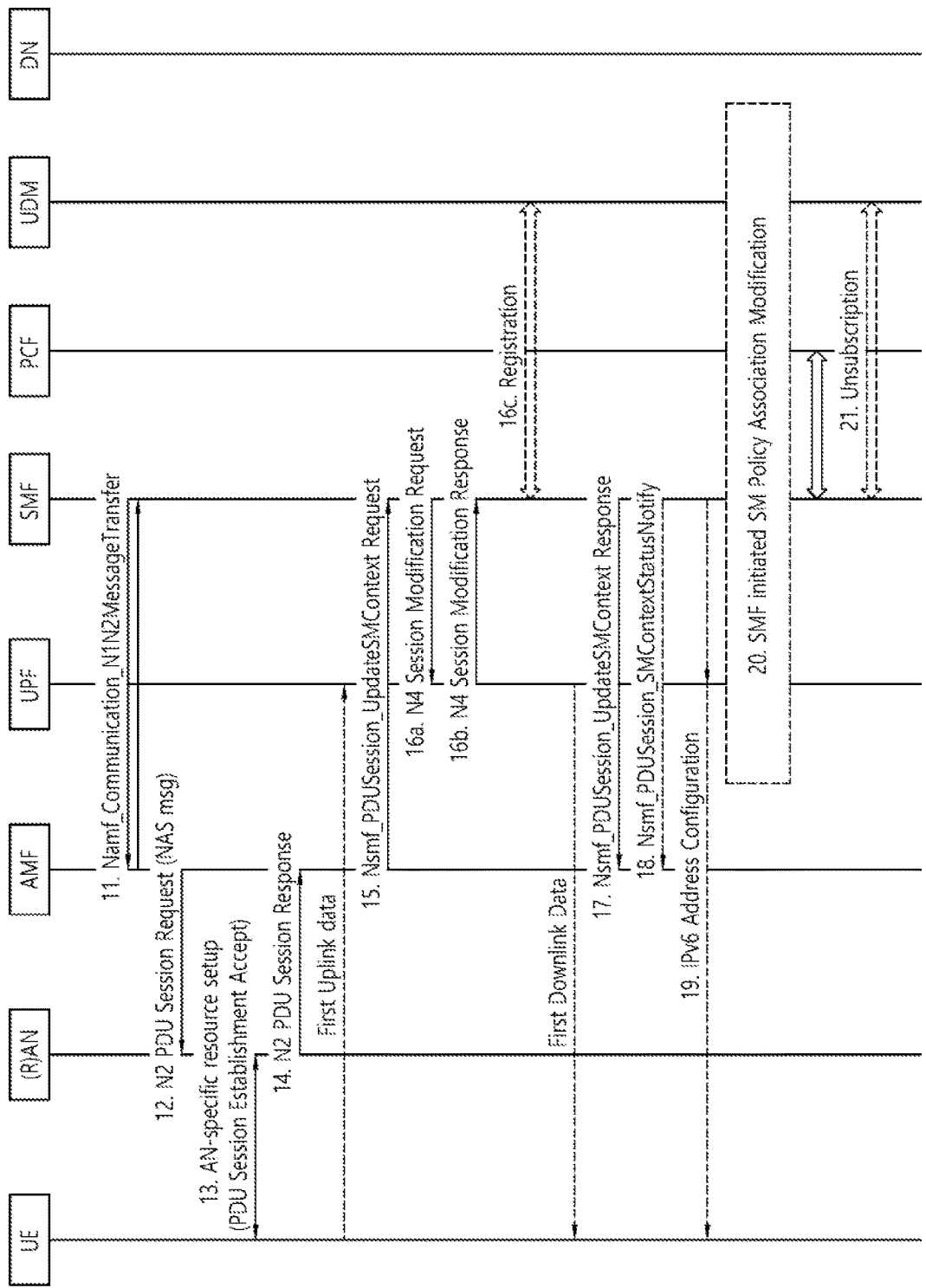

FIGS. 7a and 7b show an example of a PDU session establishment procedure to which implementations of the present disclosure is applied.

A PDU session establishment may correspond to:
a UE initiated PDU session establishment procedure.
a UE initiated PDU session handover between 3GPP and non-3GPP.
a UE initiated PDU session handover from EPS to 5GS.

a network triggered PDU session establishment procedure.

A PDU session may be associated either (a) with a single access type at a given time, i.e., either 3GPP access or non-3GPP access, or (b) simultaneously with multiple access types, i.e., one 3GPP access and one non-3GPP access. A PDU session associated with multiple access types is referred to as multi access PDU (MA PDU) session and it may be requested by access traffic steering, switching, splitting (ATSSS)-capable UEs.

Figure 9:
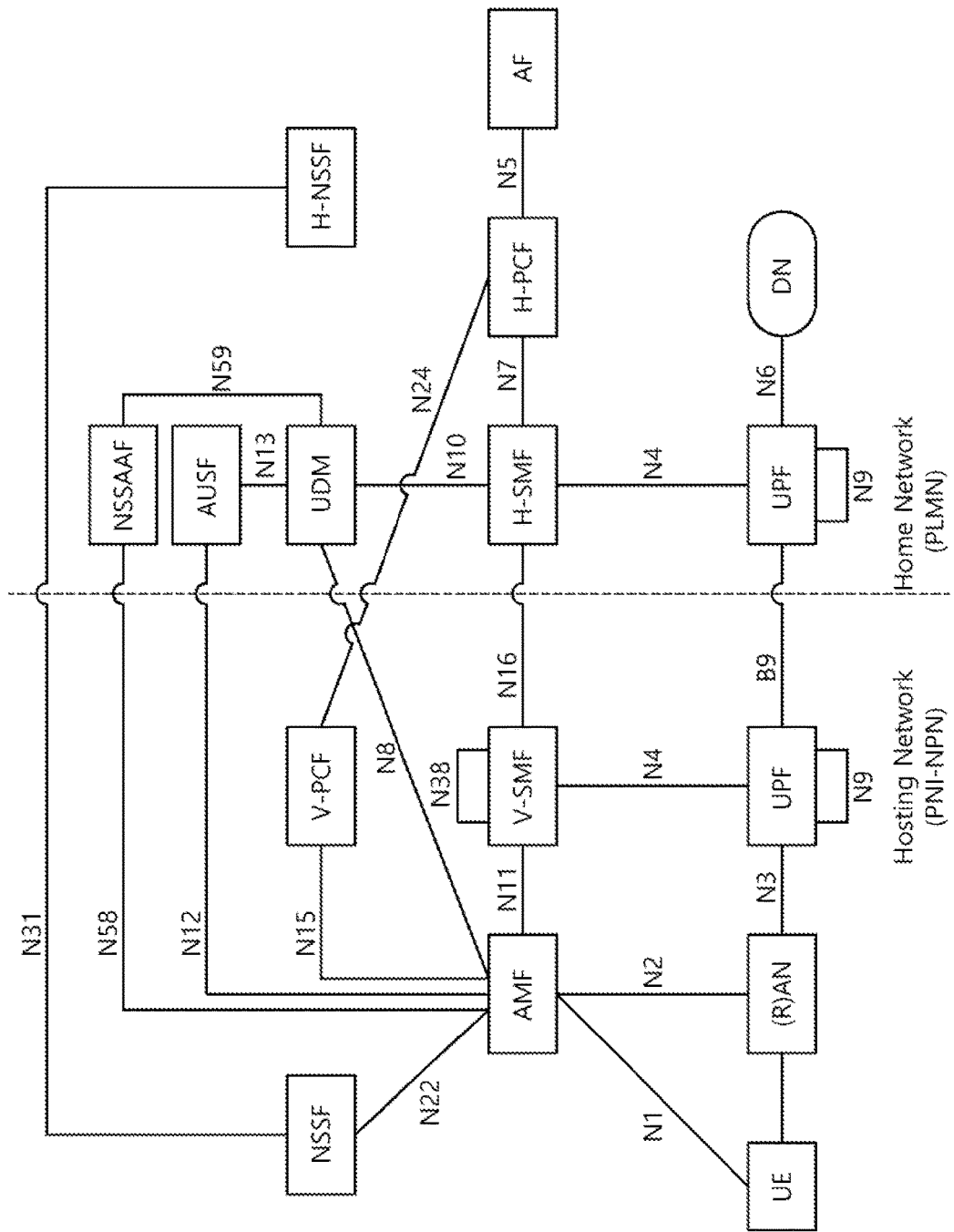
FIG. 9 shows an example of an architecture when a UE uses a service provided by a home network.

FIGS. 8 and 9 specify the procedures for establishing PDU sessions associated with a single access type at a given time.

The procedure shown in FIGS. 8 and 9 assumes that the UE has already registered on the AMF thus unless the UE is emergency registered the AMF has already retrieved the user subscription data from the UDM.

(1) Step 1: In order to establish a new PDU session, the UE generates a new PDU session ID.

The UE initiates the UE requested PDU session establishment procedure by the transmission of a NAS message containing a PDU Session Establishment Request message within the N1 SM container. The PDU Session Establishment Request message includes a PDU session ID, Requested PDU Session Type, a Requested session and service continuity (SSC) mode, 5GSM Capability, protocol configuration options (PCO), SM PDU DN Request Container, UE Integrity Protection Maximum Data Rate, etc.

The Request Type indicates "Initial request" if the PDU session establishment is a request to establish a new PDU session and indicates "Existing PDU Session" if the request refers to an existing PDU session switching between 3GPP access and non-3GPP access or to a PDU session handover from an existing packet data network (PDN) connection in EPC. The Request Type indicates "Emergency Request" if the PDU session establishment is a request to establish a PDU session for emergency services. The Request Type indicates "Existing Emergency PDU Session" if the request refers to an existing PDU session for emergency services switching between 3GPP access and non-3GPP access or to a PDU session handover from an existing PDN connection for emergency services in EPC.

The UE includes the S-NSSAI from the Allowed NSSAI of the current access type. If the Mapping of Allowed NSSAI was provided to the UE, the UE shall provide both the S-NSSAI of the visited PLMN (VPLMN) from the Allowed NSSAI and the corresponding S-NSSAI of the HPLMN from the Mapping Of Allowed NSSAI.

(2) Step 2: The AMF selects an SMF. If the Request Type indicates "Initial request" or the request is due to handover from EPS or from non-3GPP access serving by a different AMF, the AMF stores an association of the S-NSSAI(s), the data network name (DNN), the PDU session ID, the SMF ID as well as the Access Type of the PDU session.

If the Request Type is "initial request" and if the Old PDU session ID indicating the existing PDU session is also contained in the message, the AMF selects an SMF and stores an association of the new PDU Session ID, the S-NSSAI(s), the selected SMF ID as well as Access Type of the PDU Session.

If the Request Type indicates "Existing PDU Session", the AMF selects the SMF based on SMF-ID received from UDM. The AMF updates the Access Type stored for the PDU session.

If the Request Type indicates "Existing PDU Session" referring to an existing PDU session moved between 3GPP access and non-3GPP access, then if the serving PLMN S-NSSAI of the PDU session is present in the Allowed NSSAI of the target access type, the PDU session establishment procedure can be performed in the following cases:

the SMF ID corresponding to the PDU session ID and the AMF belong to the same PLMN;

the SMF ID corresponding to the PDU session ID belongs to the HPLMN;

Otherwise the AMF shall reject the PDU session establishment request with an appropriate reject cause.

The AMF shall reject a request coming from an emergency registered UE and the Request Type indicates neither "Emergency Request" nor "Existing Emergency PDU Session".

(3) Step 3: If the AMF does not have an association with an SMF for the PDU session ID provided by the UE (e.g., when Request Type indicates "initial request"), the AMF invokes Create SM Context Request procedure (e.g., Nsmf_PDUSession_CreateSMContext Request). If the AMF already has an association with an SMF for the PDU session ID provided by the UE (e.g., when Request Type indicates "existing PDU Session"), the AMF invokes Update SM Context Request procedure (e.g., Nsmf_PDUSession_UpdateSMContext Request).

The AMF sends the S-NSSAI of the serving PLMN from the Allowed NSSAI to the SMF. For roaming scenario in local breakout (LBO), the AMF also sends the corresponding S-NSSAI of the HPLMN from the Mapping Of Allowed NSSAI to the SMF.

The AMF ID is the UE's GUAMI which uniquely identifies the AMF serving the UE. The AMF forwards the PDU session ID together with the N1 SM container containing the PDU Session Establishment Request message received from the UE. The generic public subscription identifier (GPSI) shall be included if available at AMF.

The AMF provides the PEI instead of the SUPI when the UE in limited service state has registered for emergency services without providing a SUPI. In case the UE in limited service state has registered for Emergency services with a SUPI but has not been authenticated, the AMF indicates that the SUPI has not been authenticated. The SMF determines that the UE has not been authenticated when it does not receive a SUPI for the UE or when the AMF indicates that the SUPI has not been authenticated.

The AMF may include a PCF ID in the Nsmf_PDUSession_CreateSMContext Request. This PCF ID identifies the home PCF (H-PCF) in the non-roaming case and the visited PCF (V-PCF) in the LBO roaming case.

(4) Step 4: If session management subscription data for corresponding SUPI, DNN and S-NSSAI of the HPLMN is not available, then SMF may retrieve the session management subscription data from the UDM and subscribes to be notified when this subscription data is modified.

(5) Step 5: The SMF transmits either Create SM Context Response message (e.g., Nsmf_PDUSession_CreateSMContext Response) or Update SM Context Response message (e.g., Nsmf_PDUSession_UpdateSMContext Response) to the AMF, depending on the request received in step 3.

If the SMF received Nsmf_PDUSession_CreateSMContext Request in step 3 and the SMF is able to process the PDU session establishment request, the SMF creates an SM context and responds to the AMF by providing an SM Context ID.

When the SMF decides to not accept to establish a PDU session, the SMF rejects the UE request via NAS SM signaling including a relevant SM rejection cause by responding to the AMF with Nsmf_PDUSession_CreateSM- Context Response. The SMF also indicates to the AMF that the PDU session ID is to be considered as released, the SMF proceeds to step 20 below and the PDU session establishment procedure is stopped.

(6) Step 6: Optional secondary authentication/authorization may be performed.

(7a) Step 7a: If dynamic policy and charging control (PCC) is to be used for the PDU session, the SMF may perform PCF selection.

(7b) Step 7b: The SMF may perform an SM Policy Association Establishment procedure to establish an SM Policy association with the PCF and get the default PCC rules for the PDU session.

(8) Step 8: The SMF selects one or more UPFs.

(9) Step 9: The SMF may perform an SMF initiated SM Policy Association Modification procedure to provide information on the policy control request trigger condition(s) that have been met.

(10) Step 10: If Request Type indicates "initial request", the SMF may initiate an N4 Session Establishment procedure with the selected UPF. Otherwise, the SMF may initiate an N4 Session Modification procedure with the selected UPF In step 10a, the SMF may send an N4 Session Establishment/Modification Request to the UPF and provides packet detection, enforcement and reporting rules to be installed on the UPF for this PDU session. In step 10b, the UPF may acknowledge by sending an N4 Session Establishment/Modification Response.

(11) Step 11: The SMF transmits a N1N2Message Transfer message (e.g., Namf_Communication_N1N2MessageTransfer) to the AMF.

The N1N2Message Transfer message may include N2 SM information. The N2 SM information carries information that the AMF shall forward to the (R)AN which may include:

The CN Tunnel Info: Core network address(es) of the N3 tunnel corresponding to the PDU session;

One or multiple quality of service (QoS) profiles and the corresponding QoS flow IDs (QFIs);

The PDU session ID: indicate to the UE the association between (R)AN resources and a PDU session for the UE.

S-NSSAI with the value for the serving PLMN (i.e., the HPLMN S-NSSAI or, in LBO roaming case, the VPLMN S-NSSAI).

User Plane Security Enforcement information determined by the SMF.

If the User Plane Security Enforcement information indicates that integrity protection is "Preferred" or "Required", the SMF also includes the UE Integrity Protection Maximum Data Rate as received in the PDU Session Establishment Request message.

Redundancy sequence number (RSN) parameter

The N1N2Message Transfer message may include N1 SM container. The N1 SM container contains the PDU Session Establishment Accept message that the AMF shall provide to the UE. The PDU Session Establishment Accept message includes S-NSSAI from the Allowed NSSAI. For LBO roaming scenario, the PDU Session Establishment Accept message includes the S-NSSAI from the Allowed NSSAI for the VPLMN and also it includes the corresponding S-NSSAI of the HPLMN from the Mapping Of Allowed NSSAI that SMF received in step 3.

Multiple QoS Rules, QoS flow level, QoS parameters if needed for the QoS Flow(s) associated with those QoS rule(s) and QoS Profiles may be included in the PDU Session Establishment Accept message within the N1 SM container and in the N2 SM information.

If the PDU session establishment failed anywhere between step 5 and step 11, then the N1N2Message Transfer message shall include the N1 SM container with a PDU Session Establishment Reject message and shall not include any N2 SM information. The (R)AN sends the NAS message containing the PDU Session Establishment Reject message to the UE. In this case, steps 12-17 are skipped.

(12) Step 12: The AMF sends the NAS message containing PDU Session ID and PDU Session Establishment Accept message targeted to the UE and the N2 SM information received from the SMF within the N2 PDU Session Request message to the (R)AN.

(13) Step 13: The (R)AN may issue AN specific signaling exchange with the UE that is related with the information received from SMF. For example, in case of a NG-RAN, an RRC connection reconfiguration may take place with the UE establishing the necessary NG-RAN resources related to the QoS rules for the PDU session request received in step 12.

The (R)AN forwards the NAS message (PDU Session ID, N1 SM container (PDU Session Establishment Accept message)) provided in step 12 to the UE. The (R)AN shall only provide the NAS message to the UE if the AN specific signaling exchange with the UE includes the (R)AN resource additions associated to the received N2 command.

If the N2 SM information is not included in the step 11, then the following steps 14 to 16b and step 17 are omitted.

(14) Step 14: The (R)AN transmits a N2 PDU Session Response message to the AMF. The N2 PDU Session Response message may include PDU session ID, Cause, N2 SM information (PDU Session ID, AN Tunnel Info, List of accepted/rejected QFI(s), User Plane Enforcement Policy Notification)), etc.

(15) Step 15: The AMF transmits an Update SM Context Request message (e.g., Nsmf_PDUSession_UpdateSMContext Request) to the SMF. The AMF forwards the N2 SM information received from (R)AN to the SMF.

(16a) Step 516a: The SMF initiates an N4 Session Modification procedure with the UPF. The SMF provides AN Tunnel Info to the UPF as well as the corresponding forwarding rules.

(16b) Step 516b: The UPF provides an N4 Session Modification Response to the SMF.

After this step, the UPF may deliver any DL packets to the UE that may have been buffered for this PDU session.

(16c) Step 16c: If the SMF has not yet registered for this PDU session, then the SMF may register with the UDM for a given PDU Session.

(17) Step 17: The SMF transmits an Update SM Context Response message (e.g., Nsmf_PDUSession_UpdateSMContext Response) to the AMF.

After this step, the AMF forwards relevant events subscribed by the SMF.

(18) Step 18: If during the procedure, any time after step 5, the PDU session establishment is not successful, the SMF may inform the AMF by invoking Nsmf_PDUSession_SMContextStatusNotify (Release). The SMF may also release any N4 session(s) created, any PDU session address if allocated (e.g., IP address) and release the association with PCF, if any. In this case, step 19 is skipped.

(19) Step 19: In the case of PDU Session Type IPv6 or IPv4v6, the SMF may generate an IPv6 Router Advertisement and send it to the UE.

(20) Step 20: The SMF may perform SMF initiated SM Policy Association Modification.

(21) Step 21: If the PDU Session establishment failed after step 4, the SMF may unsubscribe to the modifications of session management subscription data, if the SMF is no more handling a PDU session of the UE.

<Non-Public Network (NPN)>

5G NR introduced Non-Public Network with basic functions.

An Non-Public Network (NPN) is further enhanced to enable wider collaboration between different networks/different entities to support various use cases of the NPN. For example, the various use cases include those that provide access to UEs that do not have basic credentials/subscriptions in advance, and those related to IMS and VIAPA.

In the prior art, through the discussion of NPN, various issues related to NPN have been resolved, but various key issues have not yet been resolved. For example, key issues include:

Support for equivalent Stand-alone Non-Public Network (SNPN)s

Support of non-3GPP access for SNPN services

In addition, eNPN (enhanced NPN), the result of previous research on NPN, has dealt with the basic UE onboarding function for 5GS. However, a complete solution may be required to address this. For example, during the onboarding process, the relationship between the entities involved (e.g., onboarding SNPN, subscription owner SNPN, provisioning server) may not be limited to a one-to-one relationship.

In another example, control plane provisioning allows 3GPP networks to control the entire onboarding process without relying on mechanisms outside of 3GPP and making the deployment of onboarding functions more efficient.

Therefore, future investigations and studies may be required to complete aspects that cannot be solved in the prior art.

There is a need for research aimed at investigating potential improvements in 5GS that will enable a wider range of use cases with respect to Non-Public Networks.

The scope of the study has the following aspects:

1. Supports improved mobility by supporting idle and connected mode mobility between SNPNs without new network selection.
2. Support for non-3GPP access to SNPN.
3. Addressing new requirements related to NPN. For example, a requirement may include an example of:
   a. Support for enabling localized service through local hosting NPN. For example, a local NPN may be established through interaction with a localized service provider.
   b. It may support the UE to discover, select, and access the local hosting NPN and Localized service through the hosting NPN through appropriate authorization.
      Both UE configuration for discovery and selection and user manual selection can be supported.
   c. It may support what, how, and when services are accessed over a specific network (e.g., a home network or other network (e.g., a local hosting NPN)).

Examples of requirements related to the NPN are as follows. For example, we describe an example of a requirement to provide access to a local service.

Providing access to local services may refer to the ability to provide access to a hosting network and access to a set of services provided by hosting network providers and 3rd party service providers (including other network operators and 3rd party application providers). Services may be localized (i.e., provided in a specific/restricted region) and may be time-limited. Users can become aware of available access to local services and processes for obtaining and terminating access to hosting networks and local services. This process should be efficient and convenient from a user experience point of view.

Providing access to local services opens up new opportunities for users and service providers. For example, access may be provided in areas that do not have coverage provided by other networks (e.g., fairgrounds remote from other infrastructure). Alternatively, for example, without the need for long-term business relationships, permanently installed equipment, etc, access and local services can be established as needed (short-term basis).

Types of local services and access to localized services through a hosting network can be promoted and arranged through various channels. Primarily, service operators (e.g. offline businesses, entertainment venues, construction contractors, first responders, etc.) provide information and appropriate incentives or guidance to potential users. Thus, potential users can access local services through the hosting network.

Hereinafter, examples of general requirements are described.

In the examples of the various requirements described below, the following can be assumed:

Both home network and hosting network can be a PLMN or an NPN.

Only subscribers of the public network can roam to the PLMN. An example of an interworking scenario between a network operator and an application provider for a localized service may follow the example of the prior art.

Describes the requirements for setting up Localized Services in the hosting network.

5G systems shall support appropriate mechanisms to automatically establish localized service contracts for specific circumstances (time and location) and to establish ad temporary relationships between hosting network operators and network operators or other service operators, including 3rd party application providers.

The 5G systems shall support the means by which service operators request, through standard mechanisms, the hosting network to provide access to third-party services at specific periods of time and locations. This section is flexible so that changes (e.g., cancellation or extension of local service in the service area) in service provision can be decided at any time according to the localized service contract.

According to the localized service contract, the 5G system shall provide appropriate means for service operators to request and provide various localized service requirements. Various localized service requirements may include routing policies for application of localized services through the hosting network, such as QoS, expected/maximum number of users, event information for discovery, network slicing, required IP connections, etc.

The 5G system shall support a means for the hosting network to create a policy for the requested time and location for a 3rd party service based on the received request and to configure the resource.

The 5G system shall support the means by which the hosting network informs the service operator of allowed service parameters and routing policies.

In accordance with regulatory requirements and localized service contracts, the 5G system should allow home network operators to automatically negotiate policies with hosting networks that allow home network subscribers to connect in specific cases, such as time and location, for home network services.

Under an automatic localized service agreement between the hosting network operator and the home network operator, for UEs with home network subscription only and permission to access the hosting network, the 5G system shall support:

accessing hosting network and using a localized service or a home network service through the hosting network, seamless service continuity for home network services or selected localized services when moving between two hosting networks or between a host network and a home network.

5G systems shall support mechanisms that enable network configurations that provide access to localized services so that services may be limited in terms of spatial extent (e.g. in terms of a specific topology, such as a single cell) specified by third parties.

The 5G systems shall support mechanisms that enable network configuration to provide access to localized services, so that the service may be limited in terms of available resources or capacity, subject to requirements applicable only to the service delivery area specified by the service provider of the localized service.

In order to allow the hosting network access to certain third-party services, the 5G system shall support a means of providing information for automatic discovery of the hosting network by the UE to a 3rd party service provider.

The 5G system shall support a security mechanism that allows the home network to cooperate with the hosting network so that subscribers can temporarily (e.g. based on temporary credentials) access the hosting network at a given time(start time and duration) and location.

The requirements related to user manual selection of localized services over a hosting network will be described.

The hosting network should allow the UE to manually select a temporary local service provided via a local breakout in the hosting network.

NOTE: Localized services are provided through local breakouts in the hosting network, and may be based on interworking scenarios for hosting network owned/collaborated services as indicated in the prior art.

Requirements related to UE configuration, provisioning, authentication and authorization are described.

According to the Localized service agreement, the 5G system shall allow the home network operator to authorize the UE to use the home network service through the hosting network for a specific period of time and/or location.

The 5G system should enable a trusted third-party service provider to provide localized service policies (e.g. service restrictions such as QoS, network slices for hosting or home networks, time and location) to the UE through the hosting network or the UE's home network.

The 5G system shall allow the UE to use localized services through the hosting network with a specific time (including start time and duration) and location validity using the credentials provided by the hosting network, whether or not the UE coordinates with the UE's home network.

The 5G system should allow the home network to steer the UE(s) to the hosting network, considering the location, time, range of the hosting network and the services provided by the home network and the hosting network.

Including cases where the UE does not join the hosting network and still needs to be authorized to use localized services through the hosting network, the 5G systems shall provide support to enable secure measures to authenticate and authorize users of UEs accessing the hosting network.

NOTE: For example, a network provider distributing a hosting network may assume that each identifying information about a user can be accessed through a separate registration process outside the scope of 3GPP.

The 5G system shall be able to authenticate and authorize the UE of an authenticated user to the hosting network to access the hosting network and its local services according to the request of the service provider.

The requirements related to UE Discovery, Selection, and Access will be described.

In accordance with the operator's policy and the agreement between the third party service provider and the operator, including consideration of prior service agreements with third-party service providers and no prior subscription to hosting networks, the 5G system shall allow the UE to receive and use configurations provided by third-party service providers to discover and access hosting networks and local services. If the UE can receive services from two networks at the same time, it can additionally select a hosting network. If the UE cannot maintain a connection to the home network while selecting the hosting network, the selection should only be made at the request of the user. That is, it uses manual selection.

The 5G systems shall support security measures that allow the UE to select and access localized services that may be provided by third-party service providers via the hosting network, regardless of prior subscription to a hosting network or third-party service provider.

The 5G system shall enable the UE to automatically select a hosting network to access localized services when the home network meets specified conditions (e.g., predefined time, location).

If the authentication for the localized service is no longer valid, the 5G system should be able to prevent the UE from re-accessing the hosting network after the localized service is terminated (e.g., based on certain conditions such as the user's time or location).

To display human-readable information about how to gain access to hosting networks and available 3rd party services, the 5G system may support means for UEs that may or may not have prior subscription to the hosting network.

The 5G systems must support a mechanism that allows users to manually select a specific locally hosted network.

NOTE: Additional information may be provided to the user to facilitate manual network selection.

The 5G system should be able to restrict the access of a specific UE to a configurable area of the hosting network coverage area.

The 5G system should be able to maintain the user's privacy to the hosting network while the UE is not using the hosting network, for example to prevent tracking of the UE by the hosting network.

The 5G system shall allow the home network to instruct the UE to select a hosting network with specific conditions (eg predefined time, location) based on the service provider's request.

The 5G system shall allow the UE to select a hosting network or change to a different hosting network without further user intervention in the home network, as long as the services provided (both localized services and home routing services) do not change.

The requirements related to Hosting Network Localized Services and Home Operator Services will be described.

The 5G system shall allow the home network operator to indicate to the UE which services it prefers to use in the home network when the UE connects to the hosting network and the requested service is available in both the hosting and home network.

According to the local service contract, the hosting network must be able to provide the necessary connectivity and QoS to the UEs connected simultaneously to the hosting network for local services and the home network for home network services.

The UE shall be able to connect to the hosting network and the home network through the hosting network if supported by the home network according to the localized service contract.

The requirements related to the Return to Home Network will be described.

The 5G system should provide a mechanism to alleviate the user plane and control plane overload due to the large number of UEs returning from the temporary local access of the hosting network to the home network in a very short time.

The 5G system shall provide a mechanism to minimize the impact on UE communication. For example, in order to avoid interrupting the user plane and control plane when returning to the home network with a large number of other UEs in a very short time after terminating temporary local access to the hosting network, the 5G system may provide a mechanism to minimize the impact that the 5G system has on UE communication.

The requirements related to charging will be described.

The 5G system should be able to collect charging information for the use of localized services in the hosting network according to the localized service contract and charging policy provided by the localized service provider and provide charging records to the home operator of the UE.

Requirements related to regulatory services are described.

Hosting networks using 5G systems must be able to support regulatory services (eg PWS, LI and emergency calls) according to regional/national regulatory requirements.

The requirements related to multicast/broadcast will be described.

Hosting network operators shall support mechanisms that allow other service providers of localized services to disseminate their services and content via broadcast/multicast transport. For example, to include advertisements along with other content or to include multiple content in the same media delivered to a user, this mechanism should also provide a means to include different content in the same transmission.

The hosting network should provide multicast and broadcast services in an energy efficient manner to the UEs receiving this service.

The hosting network shall support resource-efficient content delivery via multicast/broadcast.

The hosting network should support a mechanism for providing low-latency signaling for efficient content delivery to many UEs.

Even if the same service is available on both networks, according to home operator policy, the hosting network may prefer to use certain multicast and broadcast services for local access over home routed access.

II. Techniques and Procedures Related to the Disclosure of this Specification

Hereinafter, techniques and procedures related to the disclosure of the present specification will be described. In addition, examples of problems to be solved in the disclosure of the present specification may be described below.

Hereinafter, examples of problems related to NPN and/or localized service will be described.

A first example of the problem will be described.

A first example of a problem could be enabling an NPN as a hosting network to provide access to localized services.

Providing Access to Local Services means the ability to provide access to a Hosting Network and access to a set of Services provided by Hosting Network Providers and Third Party Service Providers (including other network operators and third-party application providers). Services can be localized (i.e. provided in a specific/restricted region) and time-limited. Users can become aware of available access to local services and processes for obtaining and terminating access to hosting networks and local services. This process should be efficient and convenient from a user experience point of view.

Providing access to local services opens up new opportunities for users and service providers. For example, access may be provided in areas that do not have coverage provided by other networks (e.g., cargo ships going out to sea). Alternatively, for example, without the need for long-term business relationships, permanently installed equipment, etc, access and local services can be established as needed (short-term basis).

Types of local services and access to localized services through hosting networks can be promoted and coordinated through various channels. In principle, service operators (e.g. brick and mortar companies, construction contractors, first responders, etc.) provide information and appropriate incentives or instructions to potential users to access local services via hosting networks.

The 5G networks as hosting networks that provide access to these localized services may be a PNI-NPN or a SNPN.

It is assumed that the hosting network and the localized service can be operated by different entities. A localized service can provide more than a simple data connection to the end user, e.g., it can provide additional information/incentives/instructions for accessing a localized service.

This main problem aims to solve how to enable NPN (i.e. SNPN or PNI-NPN) as a hosting network to provide access to services localized in the following aspects:

Define Hosting NPN and identify differences between Hosting NPN and NPN.

Define localized services and identify differences between localized and general services.

How a localized service contract (i.e. a service contract for a localized service) for a specific case (time and place) is automatically established and terminated, establishing a temporary relationship between the hosting network operator and the localized service provider (s).

What is needed to enable communication between the network operator deploying the hosting network and the localized service provider:

Investigate what types of interactions (e.g. hosting network configuration, reporting information) are required in relation to enabling localized service providers to get the most out of their hosting network.

A second example of the problem will be described.

A second example of the problem may be supporting a UE to discover, select and access an NPN as a hosting network and receive localized services.

A third example of the problem will be described.

A third example of a problem may be enabling access to a localized service through a specific hosting network.

Hosting an NPN gives you access to localized services. However, the home network operator of the UE may utilize the hosting network based on the relationship established between the hosting network operator and the home operator of the UE, and may allow UEs subscribed in the home network to access home network services through the hosting network in addition to the localized services. The following requirements can be defined:

- The 5G system shall be able to allow the home network to steer the UE(s) to the hosting network in consideration of the location, time, range of the hosting network and the services provided by the home network and the hosting network.
- A localized service agreement can be established (e.g., see Example 1 of the problem).
- The 5G system shall allow the home network operator to indicate to the UE which services it prefers to use in the home network when the UE connects to the hosting network and the requested service is available in both the hosting and home network.
- Based on the local service contract, the hosting network shall be able to provide the necessary connectivity and QoS to the UE connected to the hosting network for the local service and the home network for the home network service at the same time.
- The UE shall be able to connect to the home network through the hosting network and the hosting network if supported by the home network, based on the localized service contract.

This problem aims to address the following aspects:

- How and whether the home network determines the service availability of your hosting network and the home network interacts with the hosting network to authorize home network subscribers to access home network services through the hosting network at a specific time, location, and coverage of the hosting network and services provided by the hosting network.
- A method for allowing the UE to access both the home network service and the local service through the hosting network, and seamless service continuity for home network services and local services as the UE moves between different networks providing the same service. This includes how to configure the UE with information that allows the UE to recognize the services it can access via a particular network (e.g., home network or hosted NPN).
- A method for the home network determines the need to steer or direct the UE, and a method for a home network to steer or direct a UE to select a hosting network to obtain a home network service or a localized service, or to select a network for a specific service available in both the hosting and the home network.
- A method of collecting billing information for localized service usage in the hosting network and providing charging records to the UE's home operator.

NOTE: It is assumed that existing mechanisms can be used to support regulatory services (e.g. PWS and emergency services).

The disclosure of the present specification to be described below proposes a method for solving these problems.

III. Disclosure of the Present Specification

The disclosures described below in this specification may be implemented in one or more combinations (e.g., a combination including at least one of the contents described below). Each of the drawings shows an embodiment of each disclosure, but the embodiments of the drawings may be implemented in combination with each other.

The description of the method proposed in the disclosure of the present specification may consist of a combination of one or more operations/configurations/steps described below. The following methods described below may be performed or used in combination or complementarily.

In the disclosure of the present specification, the following methods are proposed in order to solve the various problems described above. The methods below may be performed or used in combination or complementary.

In various examples of the disclosure of the present specification, a method for a terminal to receive information on a localized service from a PLMN, and/or a method for a terminal to access a service provided by an NPN based on information about the localized service.

In order to use the NPN, the terminal may be provided with an NPN-related service after performing a procedure for subscribing to the NPN. However, actually, considering the NPN-related service environment, the UE may need to be provided with the NPN-related service immediately without a procedure for subscribing to the NPN. For example, the UE may need to be able to receive a service immediately without performing a procedure for subscribing to a separate NPN while being subscribed to the PLMN.

For example, if the terminal subscribed to the PLMN stays in a specific area (e.g. building, stadium, parking lot, etc.), the terminal should be able to easily receive NPN-related services provided in the corresponding area. However, in the prior art, since the terminal has to perform a procedure for subscribing to the NPN, the terminal subscribing to the PLMN cannot easily receive the NPN related service.

In order to solve this problem, there is a need for a method for the terminal to obtain information on a service (Localized Service) provided in a specific area and access the NPN network in order to access the service.

In this specification, in order to solve the problem, methods such as the following examples are proposed. The methods presented below may be performed or used in combination or complementary.

For reference, in the various examples described below, it is assumed that redirection is performed during the registration procedure, but this is only an example. For example, various operations described in the disclosure of this specification may be applied to a situation in which a service request procedure is performed.

Hereinafter, the disclosure of the present specification will be described with reference to the first to fourth examples of the disclosure of the present specification. The first to fourth examples of the disclosure of the present specification described below may be implemented in combination. For reference, the fourth example of the disclosure of the present specification may represent a specific embodiment based on a combination of at least one of the first to third examples of the disclosure of the present specification.

1. First Example of the Disclosure of the Present Specification

A first example of the disclosure of the present specification describes an example of accessing a localized service using a roaming architecture.

The first example of the present disclosure may solve examples of the aforementioned problem. For example, a third example of the problem (e.g. enabling access to localized services through a specific hosting network) could be addressed. The basic principle of this first example is to reuse existing roaming architectures and Local Area Data Network (LADN) mechanisms.

In the first example of the present disclosure, it is assumed that the home network of the UE is a PLMN and the hosting network is a PNI-NPN.

FIG. 8 shows an example architecture when a UE uses a localized service provided by a hosting network.

FIG. 9 shows an example of an architecture when a UE uses a service provided by a home network.

FIGS. 8 and 9 show the proposed architecture that reuses the 5G system roaming architecture in case of local breakout and home routing scenarios. When a UE registers with a selected hosting network and receives localized services provided by the hosting network, the architecture of FIG. 8 is used. If the UE also needs to receive service from the home network, the UE may establish a home routed PDU session as shown in FIG. 9. Whether the UE receives a specific service from the hosting network or the home network is determined based on subscriber information of the UE, and a local breakout session or a home routing session is created based on the subscriber information. The UE only follows the existing PDU session establishment procedure based on the URSP rule provided by the home network.

When the UE registers with the hosting network, the AMF provides LADN information (e.g., LADN DNN and LADN service area) to the UE. The UE uses the LADN information to access localized services provided by the hosting network.

Note: When the host network operator sets the LADN information to the AMF, the operator can set/provide the relevant validity time of the LADN DNN so that the AMF can provide the LADN information when the validity time is met.

For example, the AMF may provide LADN information to the UE. The LADN information may include, for example, information related to a LADN DNN and/or a LADN service area.

The LADN information provided by the AMF to the UE may additionally include one or more of the following information:
  LADN Data Network Name (DNN) or LADN validity time or validity period
  LADN DNN or LADN end time/time
  LADN Single Network Slice Selection Assistance Information (S-NSSAI)

The LADN DNN may be related to one localized service or multiple localized services. The LADN DNN may be associated with one localized service (in this case, a separate LADN DNN is operated for each localized service). Alternatively, the LADN DNN may be associated with a plurality of localized services.

In the latter case (e.g. LADN DNN is associated with multiple localized services), the LADN service area may be service area information in a form that covers all service areas of related localized services. For example, the information related to the LADN service area may be information about a service area covering all the service areas of a plurality of localized services.

In addition, in the latter case (e.g., when LADN DNN is associated with multiple localized services), the LADN validity time or validity period may be information about the validity time or validity period in a form that covers all the validity time or validity period of the connected localized services. For example, LADN validity time or validity period may be information about validity time or validity period that covers all validity time or validity period of multiple localized services.

In addition, in the latter case (e.g., when LADN DNN is associated with multiple localized services), the LADN end time/time may be end time/time information in a form that covers all end time/time of related localized services. For example, the LADN end time/time may be information about a validity time or validity period that covers all of the LADN end time/time of a plurality of localized services.

The UE may be provided with the LADN validity time or validity period or the LADN end time/time from the AMF. In this case, when the LADN validity time or validity period or a time/period based on the LADN end time/time expires, the UE may release the associated PDU Session. In addition, if all PDU Sessions for the UE are released and the localized service to be received by the UE no longer exists, the UE may perform a deregister procedure for the hosting network.

When the LADN validity time or validity period or a time/period based on the LADN end time/time expires, the AMF or the SMF may release a related PDU Session. In addition, if all PDU Sessions for the UE are released and the localized service to be received by the UE no longer exists, an AMF may deregister the UE. For example, the AMF may perform a deregister procedure for the UE.

The LADN information may be defined as a new type of localized service related information (e.g., providing access to local services (PALS) information). For example, the names of LADN DNN and LADN service area are merely examples. In various examples of the disclosure of the present specification, information such as LADN DNN and LADN service area may be referred to as PALS DNN, PALS service area, etc., instead of the existing name. Similar to LADN information, the UE Configuration Update procedure may be used in the case of a new type of localized service related information. For example, the AMF may also provide or delete the new type of localized service related information to the UE by using the UE Configuration Update procedure. In other words, like LADN information, even in the case of the new type of localized service-related information, the AMF may be provided to the UE or deleted using the UE Configuration Update procedure.

The AMF may store LADN information provided to the terminal. If the validity time has passed and the localized service is no longer provided, the AMF may provide the updated LADN information to the UE in order to delete the stored LADN information. This is done through the conventional UE Configuration Update (UCU) procedure. For example, in this case, the AMF may provide updated LADN information through the conventional UCU procedure. If the validity time for all LADNs becomes invalid, the AMF may delete the LADN information through the UCU procedure. Instead of separately storing the LADN information provided for each UE, the AMF may update or delete LADN information only for UEs having a PDU Session connected through the current LADN DNN. Also, when the UE requests a PDU session for the LADN DNN (e.g., when the UE requests establishment of a PDU session for the LADN DNN), the AMF may determine whether to process the terminal's request by checking the validity time of the corresponding LADN DNN. If the validity time is invalid, the AMF may give (e.g., transmit) a cause indicating this (e.g., information that the validity time is invalid) to the terminal, and reject the terminal's request.

The V-PCF of the hosting network may provide localized service information to the H-PCF during the UE Policy Association establishment procedure or the UE Policy Association Modification procedure. Based on the location information of the UE (e.g., UE Location Information (ULI)), the V-PCF may determine the localized services available at the current UE location. The localized service information may include, for example, a DNN, time and location information for the localized service, and a traffic descriptor (refer to TS 23.503 V16.10.0). The H-PCF may use the information received from the V-PCF to create a URSP rule for the localized service.

As another example, instead of the PCF storing the localized service information, information on the localized service may be configured in the AMF. Then, the AMF may directly transmit localized service information to the PCF of the hosting network, and the PCF of the hosting network may transmit it to the PCF of the home network.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 10:
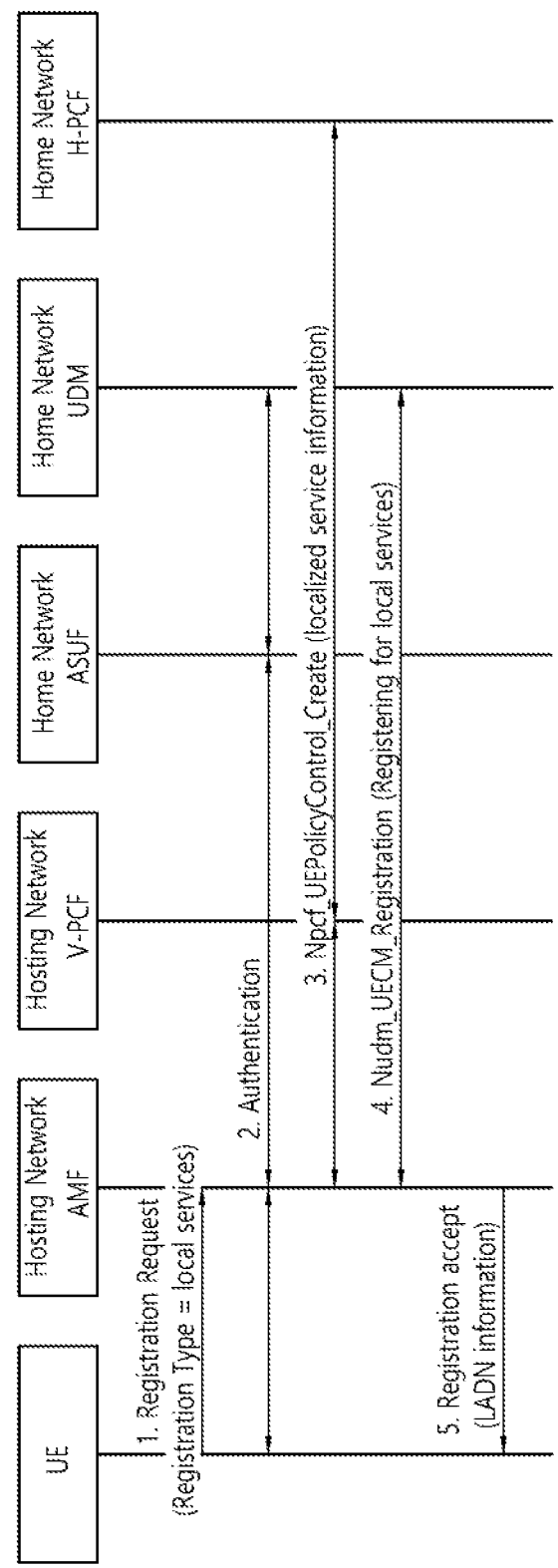
FIG. 10 shows an example of a registration procedure according to the first example of the disclosure of the present specification.

FIG. 10 shows an example of a registration procedure according to the first example of the disclosure of the present specification.

The example of FIG. 10 shows an example of a registration procedure in a hosting network. That is, the example of FIG. 10 is an example of Registration in the hosting network.

The registration procedure related to FIG. 10 will be described with a focus on differences from the conventional registration procedure. For example, for an operation not described below, the registration procedure with reference to FIGS. 6*a* and 6*b* or the registration procedure of TS 23.502 V16.3.0 may be applied. For example, the registration procedure can be used with the following modifications:

When the UE performs the initial registration procedure, the registration type may indicate that the UE is accessing the network for local service. Based on this information, the AMF may decide to provide LADN information to the UE.

During the UE Policy Association establishment procedure, the V-PCF may provide available localized service information to the H-PCF.

The AMF may indicate to the UDM that the UE is registering for a localized service. The UDM may use the indication to determine whether to accept the UE registration.

An example of the registration procedure according to the example of FIG. 10 will be described in detail as follows.

1. The UE may transmit a registration request message to the AMF of the hosting network. The registration request message may include registration type information. Registration type information may include local services information. The registration type may indicate that the UE is accessing the network for local service. For reference, the UE may notify registration for a localized service through a separate indication instead of registration type information.
2. The UE, the AMF of the hosting network, the ASUF of the home network, and the UDM of the home network may perform an authentication procedure.
3. The AMF of the hosting network, the V-PCF of the hosting network, and the H-PCF of the home network may perform the UE Policy Association establishment procedure. The V-PCF of the hosting network may transmit localized service information (e.g., available localized service information) to the H-PCF of the home network. For example, the AMF of the hosting network, the V-PCF of the hosting network, and the H-PCF of the home network may perform the Npcf_U-EPolicyControl_Create procedure.
4. The AMF of the hosting network may perform the procedure for registering the UDM and the local service of the home network. For example, the AMF may perform the Nudm_UECM_Registration procedure with the UDM of the home network. The AMF may indicate to the UDM that the AMF is registering the UE for a localized service. The UDM may use the indication to determine whether to accept the UE registration.
5. The AMF of the hosting network may send a registration accept message to the UE. The registration accept message may include LADN information.

According to a first example of the disclosure of this specification, the UE may indicate that the UE is accessing the network for a localized service during a registration procedure. The AMF may indicate to the UDM that the UE is registering for a localized service. The V-PCF may provide localized service information to the H-PCF during the UE Policy Association establishment procedure or the UE Policy Association Modification procedure. The UDM may determine whether to accept the registration taking into account the indication that the UE is registering for the localized service.

2. Second Example of the Disclosure of the Present Specification

Regarding the search and selection of hosting networks, there are the following problems. How the UE discovers and selects PNI-NPN (including whether a CAG is supported and how it is supported) for local service is not discussed.

According to the second example of the disclosure of the present specification, the AMF of the home network may provide Localized Service Information to the UE at the request of the UE or according to the operator policy. The localized service information may include hosting network information that provides a specific localized service. Based on this information, the UE can start discovering the hosting network.

In the case of HPLMN, there are the following problems. Whether and how to support the scenario that the PNI-NPN is in the HPLMN is not discussed.

According to a second example of the present disclosure, there is no need to perform hosting network selection if the PNI-NPN is in the hosting network. In this case, the UE may skip the hosting network selection and receive a Localized service by establishing a PDU session using the LADN DNN.

For reference, the second example disclosed herein may be an example in which the home network is a PLMN and the hosting network is a PNI-NPN.

The architecture according to the examples of FIGS. 8 and 9 described above may be applied to the second example of the disclosure of the present specification.

FIGS. 8 and 9 show the proposed architecture that reuses the 5G system roaming architecture in case of local breakout and home routing scenarios. When a UE registers with a selected hosting network and receives localized services provided by the hosting network, the architecture of FIG. 8 is used. If the UE also needs to receive service from the home network, the UE may establish a home routed PDU session as shown in FIG. 9. Whether the UE receives a specific service from the hosting network or the home network is determined based on subscriber information of the UE, and a local breakout session or a home routing session is created based on the subscriber information. The UE only follows the existing PDU session establishment procedure based on the URSP rule provided by the home network.

Examples related to Hosting network discovery and selection will be described.

Assuming that there is a service level agreement between the home network and the hosting network, Localized Service Information may be configured for the AMF of the home network according to this agreement. Localized Service Information may include one or more of the following information:

Localized Service name
Validity condition: may include, for example, Time and Spatial validity information.
Hosting network information: may include, for example, precedence information, hosting network ID (PLMN ID) and RAT type (e.g. NR, E-UTRA, Untrusted Non-3GPP) information, non-3GPP selection information (if RAT type is related to non-3GPP access).
LADN DNN
Allowed Closed Access Group(CAG) information
NOTE 1: When the Localized service is provided in the home network (i.e., when the PNI-NPN is in the home network), the hosting network information may be omitted.

When the UE is registered in the home network, the UE may request Localized Service Information from the AMF by sending a NAS message (e.g., a registration request message). When the UE's subscription allows to use the Localized service, the AMF may provide Localized service information to the UE. The UE may store the received Localized Service Information until the time validity condition is satisfied. The spatial validity condition of Localized Service Information can be expressed as a geographic area. The exact service area information of the hosting network may be provided to the UE as part of the LADN information during registration with the hosting network.

NOTE 2: In the case of a roaming scenario, the AMF of the serving PLMN may provide localized service information to the UE.

NOTE 3: The AMF may provide Localized Service Information to the UE without a UE request if the UE's subscription allows to use the Localized service. For example, when the UE enters an area in which a localized service is available, the AMF may provide Localized service information.

Instead of providing Allowed CAG information to the UE in Localized Service Information, the hosting network may provide the Allowed CAG list to the UE using an existing procedure. However, in the case of a roaming scenario, since the prior art allows only the CAG information of the serving PLMN to be updated, the serving PLMN cannot provide the inbound roamer with the Hosting Network's list of allowed CAGs. When the UE receives Allowed CAG information through Localized Service Information, the UE shall use the Allowed CAG information only when the UE accesses the hosting network for the Localized service.

Describes examples related to registration with a hosting network and access to Localized services.

Based on the received Localized Service Information, the UE may select a hosting network and register with the network. The UE may register with the hosting network and subscribe to a specific LADN DNN or wildcard DNN for local service. In this case, the AMF may provide LADN information (i.e., LADN DNN and LADN service area) to the UE according to the existing LADN mechanism. The UE may use the LADN information to access localized services provided by the hosting network.

NOTE 1: When the host network operator sets the LADN information to the AMF, the operator provides the relevant effective time of the LADN DNN so that the AMF may provide the LADN information when the effective time is satisfied.

NOTE 2: If the localized service is provided in the home network (i.e. the PNI-NPN is in the home network), the UE may skip hosting network selection. When the validity condition of Localized Service Information is satisfied, the UE may request LADN information from the AMF according to the existing LADN mechanism.

The UE may request localized service information from the AMF.

An example in which the UE requests Localized service information will be described with reference to FIG. 11.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 11:
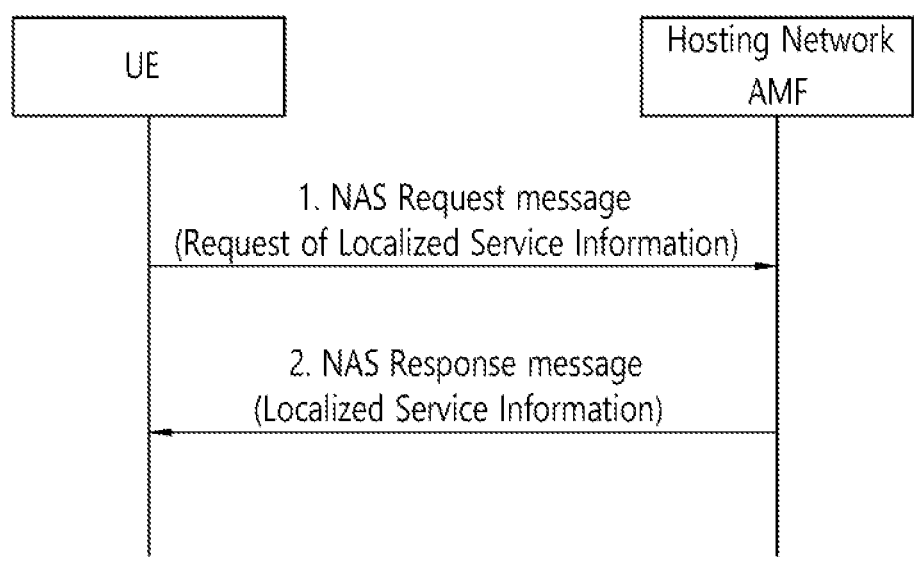
FIG. 11 shows an example of requesting localized service information according to an embodiment in the disclosure of the present specification.

FIG. 11 shows an example of requesting localized service information according to an embodiment in the disclosure of the present specification.

Referring to FIG. 11, an example in which the UE requests Localized service information is shown.

The UE may request Localized Service Information from the AMF by sending a NAS message (e.g., a registration request). The UE may indicate a specific service that the UE wants to receive by including Localized service information (eg Localized service name, Application Id, etc.) in the NAS message. As described in the example with reference to FIGS. 8 and 9, the AMF may provide Localized Service Information to the UE.

Note: UE may obtain localized service information through web page, application installation, etc.

According to the example of FIG. 11, the UE may transmit a NAS request message to the AMF of the home network. The NAS request message may include information for requesting localized service information.

Then, the AMF of the home network may transmit a NAS response message to the UE. The NAS response message may include localized service information.

Examples related to hosting network connections and access to localized services are described.

A method for registering with a hosting network and accessing a localized service is described with reference to FIG. 12.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 12:
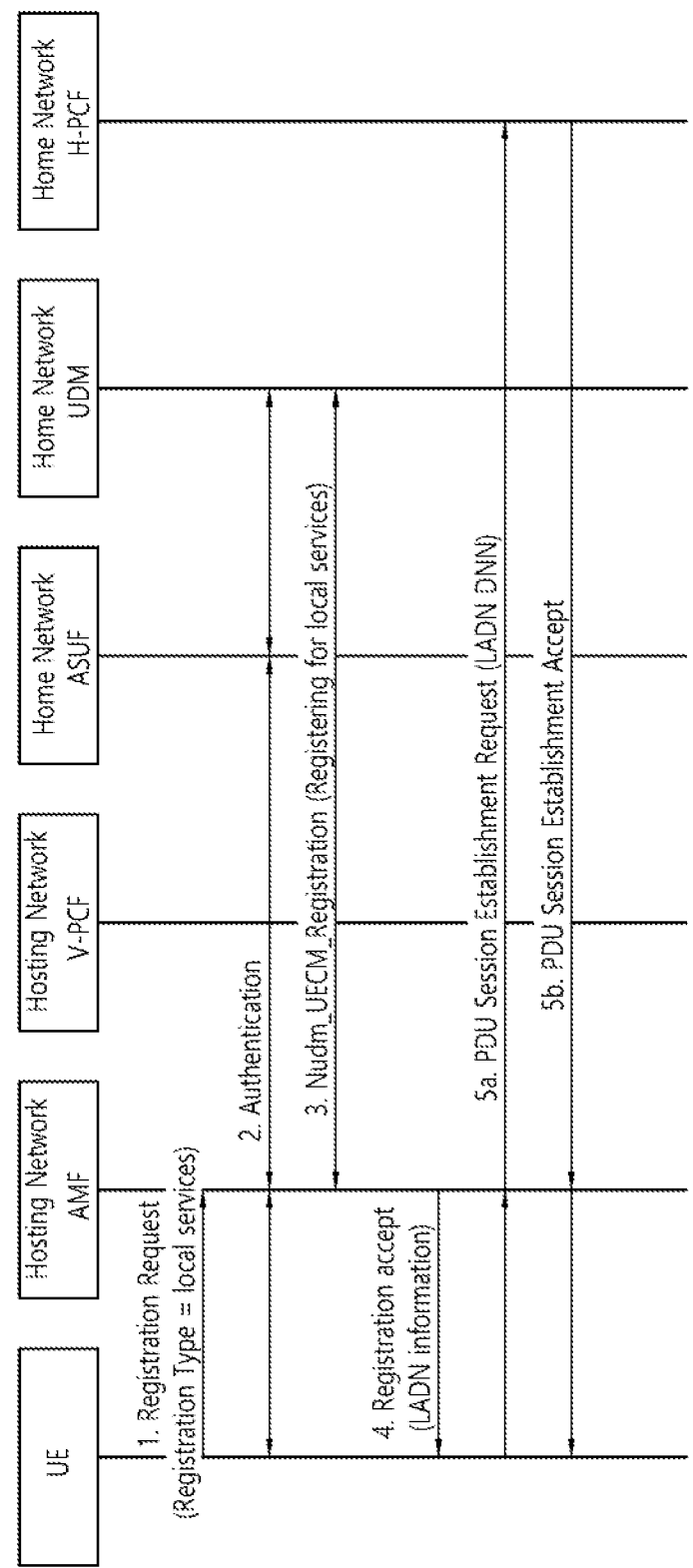
FIG. 12 shows an example of a registration procedure according to a second example of the disclosure of the present specification.

FIG. 12 shows an example of a registration procedure according to a second example of the disclosure of the present specification.

The example of FIG. 12 shows an example of a registration procedure in a hosting network and an access procedure to a localized service. That is, the example of FIG. 12 is an example of Registration in the hosting network and access to Localized services.

If the UE wants to receive the Localized service, the UE may request Localized service information as specified in FIG. 11 and the UE may select a hosting network based on the received Localized Service Information. If the selected hosting network is available, the UE may perform registration with the selected hosting network.

The registration procedure related to FIG. 12 will be described with a focus on differences from the conventional registration procedure. For example, for an operation not described below, the registration procedure with reference to FIGS. 6a and 6b or the registration procedure of TS 23.502 V16.3.0 may be applied. For example, the registration procedure can be used with the following modifications:

When the UE performs the initial registration procedure, the registration type may indicate that the UE is accessing the network for a localized service. Based on this information, the AMF may determine to provide LADN information to the UE.

The AMF may indicate to the UDM that the UE is registering for a localized service. The UDM may use this indication to determine whether to accept the UE registration.

The URSP rule for allowing the UE to generate a PDU Session through the LADN DNN can be downloaded at any time from the UE's HPLMN.

After the registration procedure is completed, the UE may establish a PDU session for the LADN DNN.

Refer to FIG. 12, the following operations may be performed.

1. The UE may transmit a registration request message to the AMF of the hosting network. The registration request message may include registration type information. The registration type information may include local services information. The registration type may indicate that the UE is accessing the network for local service. For reference, the UE may notify registration for a localized service through a separate indication instead of registration type information.
2. The UE, the AMF of the hosting network, the ASUF of the home network, and the UDM of the home network may perform an authentication procedure.
3. The AMF of the hosting network may perform the procedure for registering the UDM and local service of the home network. For example, the AMF may perform the Nudm_UECM_Registration procedure with the UDM of the home network. The AMF may indicate to the UDM that the AMF is registering the UE for a localized service. The UDM may use the indication to determine whether to accept the UE registration.
4. The AMF of the hosting network may send a registration accept message to the UE. The registration accept message may include LADN information.
5a. The UE may transmit a PDU session establishment request message to the SMF of the hosting network via the AMF of the hosting network. The PDU session establishment request message may include LADN DNN information. For example, the UE may transmit a PDU session establishment request message including LADN DNN information to use a localized service.
5b. The SMF of the hosting network may transmit a PDU session establishment accept message to the UE through the AMF of the hosting network.

According to a second example of the disclosure of this specification, the UE may indicate that the UE is accessing the network for a localized service during a registration procedure. The AMF may indicate to the UDM that the UE is registering for a localized service. In addition, the UE may request and receive Localized Service Information from the AMF, and may select a hosting network based on the received Localized Service Information. In addition, the AMF may provide Localized Service Information to the UE. The UDM may decide whether to accept the registration taking into account the indication that the UE is registering for the localized service.

3. Third Example of the Disclosure of the Present Specification

A third example of the disclosure of this specification describes an example of how to access a localized service using the LADN and N3IWF overlay architecture.

The third example of the present disclosure can solve the example of the above-mentioned problem. For example, a third example of the disclosure herein addresses a second example of a problem (e.g., supporting the UE to discover, select and access NPN as a hosting network and receive localized services) and a third example of a problem (e.g., enabling access to a localized service through a specific hosting network). The basic principle of the third example of the present disclosure may be to reuse the N3IWF overlay architecture and the LADN mechanism.

The third example of the present disclosure may be applied to the following cases:
When the home network is PLMN and the hosting network is SNPN.
When the home network is SLMN and the hosting network is SNPN.
When the home network is SNPN and the hosting network is PNI-NPN.
Note: A case in which the home network is a PLMN and the hosting network is a PNI-NPN, may be covered in the second example of disclosure.

Figure 13:
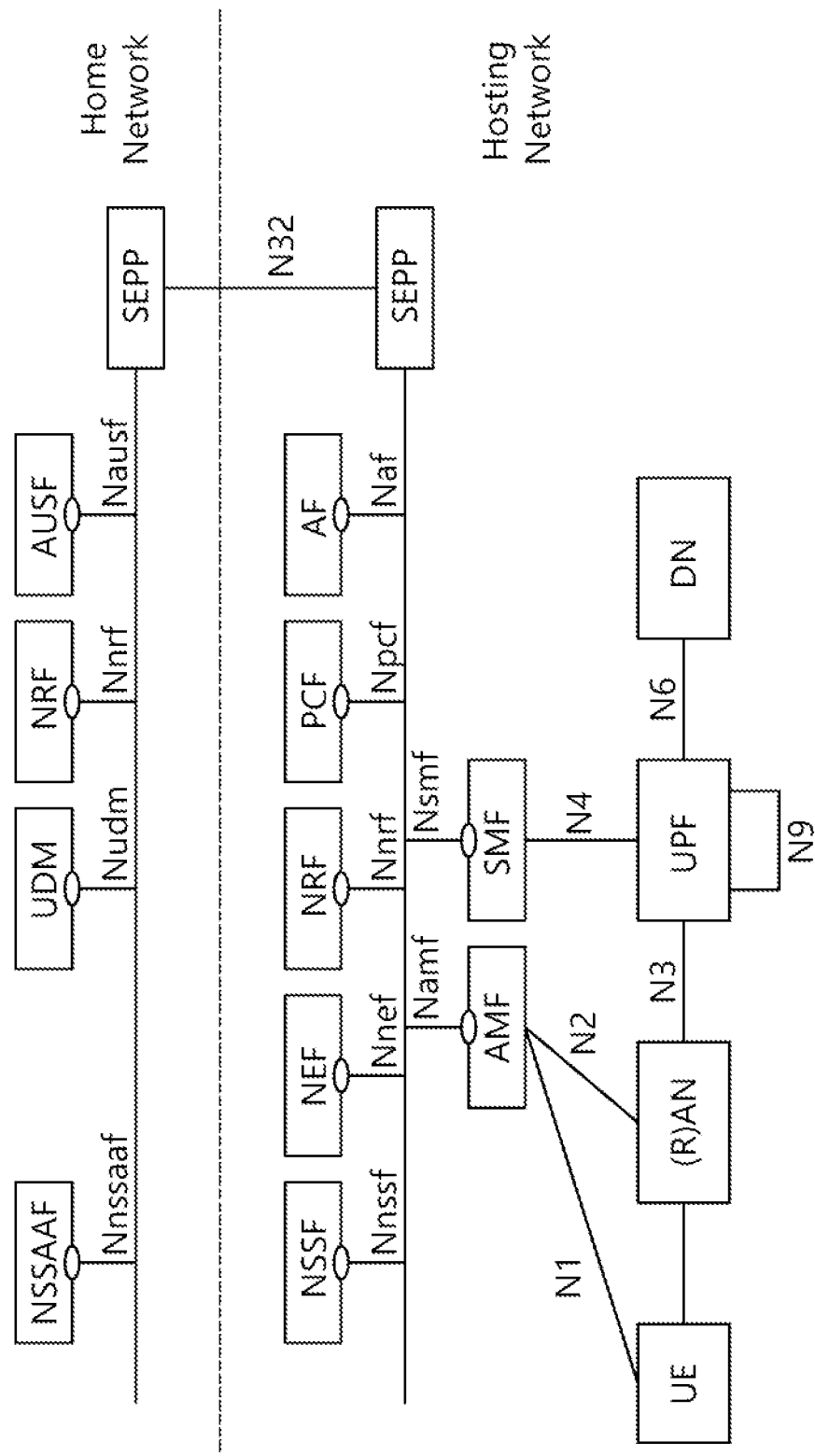
FIG. 13 shows an example architecture when the UE uses a localized service provided by a hosting network.
Figure 14:
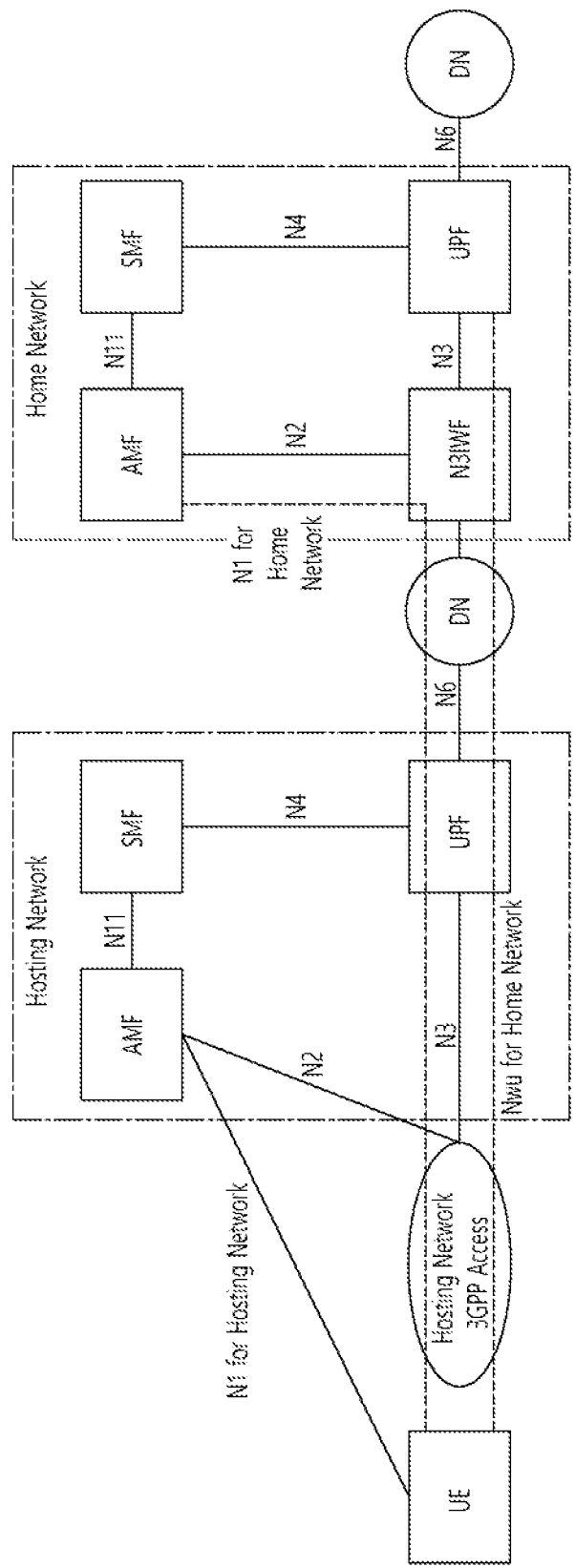
FIG. 14 shows an example of an architecture when a UE uses a service provided by a home network.

For the third example of the disclosure of the present specification, the architecture according to the example of FIG. 13 and the example of FIG. 14 may be applied.

FIG. 13 shows an example architecture when the UE uses a localized service provided by a hosting network.

FIG. 14 shows an example of an architecture when a UE uses a service provided by a home network.

FIGS. 13 and 14 show a proposed architecture that reuses a 5G system architecture that accesses SNPN using credentials from Credentials Holder and a 5G system architecture that accesses an overlay network (home network) through an underlay network (hosting network). The architecture of FIG. 13 may be used when the UE registers with a selected hosting network and receives localized services provided by the hosting network. When the UE also needs to receive a service from the home network, the UE may establish a PDU session as shown in FIG. 14. Whether the UE receives a specific service from the hosting network or the home network may be determined based on the URSP rule of the UE. The UE may follow the existing PDU session establishment procedure based on the URSP rule provided by the home network.

Examples related to Hosting network discovery and selection will be described.

Assuming that there is a service level agreement between the home network and the hosting network, Localized Service Information may be configured for the AMF of the home network according to this agreement. Localized Service Information may include one or more of the following information:

Localized Service name

Validity condition: may include, for example, Time and Spatial validity information.

Hosting network information: may include, for example, precedence information, hosting network ID (PLMN ID) and RAT type (e.g. NR, E-UTRA, Untrusted Non-3GPP) information, non-3GPP selection information (if RAT type is related to non-3GPP access).

LADN DNN

Allowed CAG information

When the UE is registered in the home network, the UE may request Localized Service Information from the AMF by transmitting a NAS message (e.g., a registration request message). When the UE's subscription allows to use the Localized service, the AMF may provide Localized service information to the UE. The UE may store the received Localized Service Information until the time validity condition is satisfied. The spatial validity condition of Localized Service Information can be expressed as a geographic area. The exact service area information of the hosting network may be provided to the UE as part of the LADN information during registration with the hosting network.

NOTE 1: In the case of a roaming scenario, the AMF of the serving PLMN may provide localized service information to the UE.

NOTE 2: AMF may provide Localized Service Information to the UE without a UE request if the UE's subscription allows it to use the Localized service. For example, when the UE enters an area in which a localized service is available, the AMF may provide Localized service information.

When the hosting network uses a CAG for Localized service (i.e., when the hosting network is PNI-NPN), Allowed CAG information may be provided to the UE. When the UE receives Allowed CAG information through Localized Service Information, the UE may use the Allowed CAG information only when the UE accesses the hosting network for the Localized service.

Describes examples related to registration with a hosting network and access to Localized services.

Based on the received Localized Service Information, the UE may select a hosting network and register with the network. The UE may register with the hosting network and subscribe to a specific LADN DNN or wildcard DNN for local service. In this case, the AMF may provide LADN information (i.e., LADN DNN and LADN service area) to the UE according to the existing LADN mechanism. The UE may use the LADN information to access localized services provided by the hosting network.

NOTE 1: When the host network operator configures the LADN information in the AMF, the operator may provide the relevant effective time of the LADN DNN so that the AMF can provide the LADN information when the effective time is satisfied.

For an example in which the UE requests Localized service information, the contents described in the example of FIG. 11 and the second example of the disclosure of the present specification may be equally applied.

Examples related to hosting network connections and access to localized services are described.

A method of registering with a hosting network and accessing a localized service is described with reference to FIG. 15.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 15:
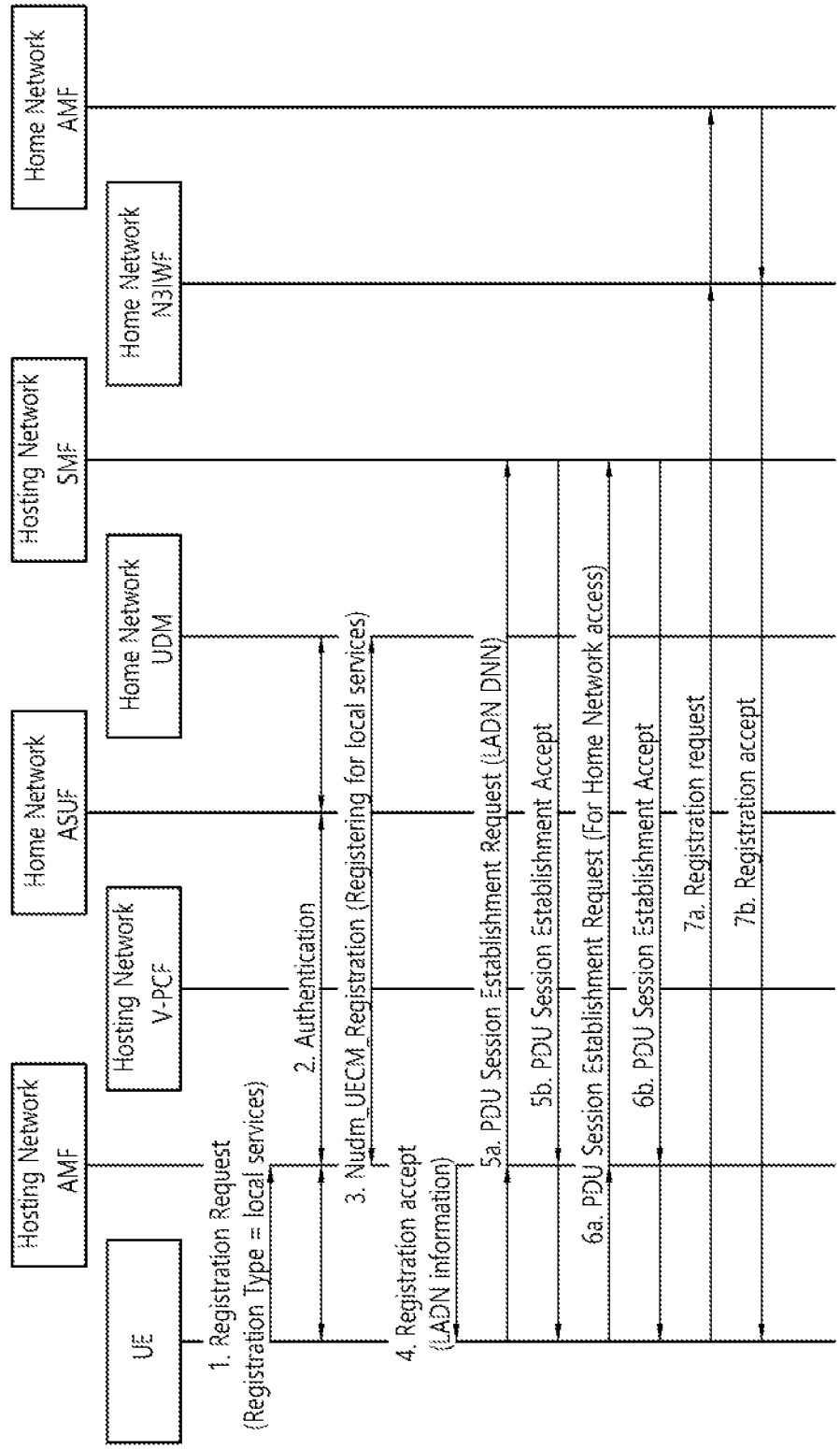
FIG. 15 shows an example of a registration procedure according to a third example of the disclosure of the present specification.

FIG. 15 shows an example of a registration procedure according to a third example of the disclosure of the present specification.

The example of FIG. 15 shows an example of a registration procedure in a hosting network and an access procedure to a localized service. That is, the example of FIG. 15 is an example of Registration in the hosting network and access to Localized services.

If the UE wants to receive the Localized service, the UE may request Localized service information as specified in FIG. 11 and may select a hosting network based on the received Localized Service Information. If the selected hosting network is available, the UE may perform registration with the selected hosting network.

A registration procedure related to FIG. 15 will be described with a focus on differences from the conventional registration procedure. For example, for an operation not described below, the registration procedure with reference to FIGS. 6a and 6b or the registration procedure of TS 23.502 V16.3.0 may be applied. For example, the registration procedure can be used with the following modifications:

When the UE performs the initial registration procedure, the registration type may indicate that the UE is accessing the network for a localized service. Based on this information, the AMF may decide to provide LADN information to the UE.

The AMF may indicate to the UDM that the UE is registering for a localized service. The UDM may use this indication to determine whether to accept the UE registration.

Terminal may register with hosting network for local service (e.g. to notify registration to receive localized service, when the terminal informs that the registration type is local service, and/or when requesting LADN DNN information for localized service, etc.). In this case, when generating a UE policy association or through the UE policy association modification procedure, the AMF may inform the PCF that the UE registers for a localized service. Based on this, the PCF may perform an operation of updating the URSP rule for the localized service. In this case, the URSP rule may be provided by the PCF of the hosting network, not the PCF of the home network.

After the registration procedure is completed, the UE may establish a PDU session for the LADN DNN.

When the UE needs to receive the home network service, the UE may establish a PDU session and register with the home network through the N3IWF.

Referring to FIG. 15, the following operations may be performed.

1. The UE may send a registration request message to the AMF of the hosting network. The registration request message may include registration type information. The registration type information may include local services information. The registration type may indicate that the UE is accessing the network for local service. For reference, the UE may notify registration for a localized service through a separate indication instead of registration type information.

2. The UE, the AMF of the hosting network, the AUSF of the home network, and the UDM of the home network may perform an authentication procedure.

3. The AMF of the hosting network may perform the procedure for registering the UDM and local service of the home network. For example, the AMF may perform the Nudm_UECM_Registration procedure with the UDM of the home network. The AMF may indicate to the UDM that the AMF is registering the UE for a localized service. The UDM may use the indication to determine whether to accept the UE registration.

4. The AMF of the hosting network may send a registration accept message to the UE. The registration accept message may include LADN information.

5a. The UE may transmit a PDU session establishment request message to the SMF of the hosting network via the AMF of the hosting network. The PDU session establishment request message may include LADN DNN information. For example, the UE may transmit a PDU session establishment request message including LADN DNN information to use a localized service.

5b. The SMF of the hosting network may transmit a PDU session establishment accept message to the UE through the AMF of the hosting network.

6a. The UE may transmit a PDU session establishment request message to the SMF of the hosting network via the AMF of the hosting network. The PDU session establishment request message may include information that is a request for home network access.

6b. The SMF of the hosting network may transmit a PDU session establishment accept message to the UE through the AMF of the hosting network.

7a. The UE may transmit the registration request message to the AMF of the home network via the N3IWF of the home network.

7b. The AMF of the home network may transmit a registration accept message to the UE via the N3IWF of the home network.

According to a third example of the disclosure of the present specification, the UE may indicate that the UE is accessing the network for a localized service during a registration procedure. The AMF may indicate to the UDM that the UE is registering for a localized service. In addition, the UE may request and receive Localized Service Information from the AMF, and may select a hosting network based on the received Localized Service Information. In addition, the AMF may provide Localized Service Information to the UE. The UDM may decide whether to accept the registration taking into account the indication that the UE is registering for the localized service.

4. Fourth Example of the Disclosure of the Present Specification

A fourth example of the disclosure of the present specification may represent a specific embodiment based on a combination of at least one of the first to third examples of the disclosure of the present specification.

Hereinafter, with reference to FIG. 16, the operation of the UE and the operation of the AMF according to various examples of the disclosure will be described.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 16:
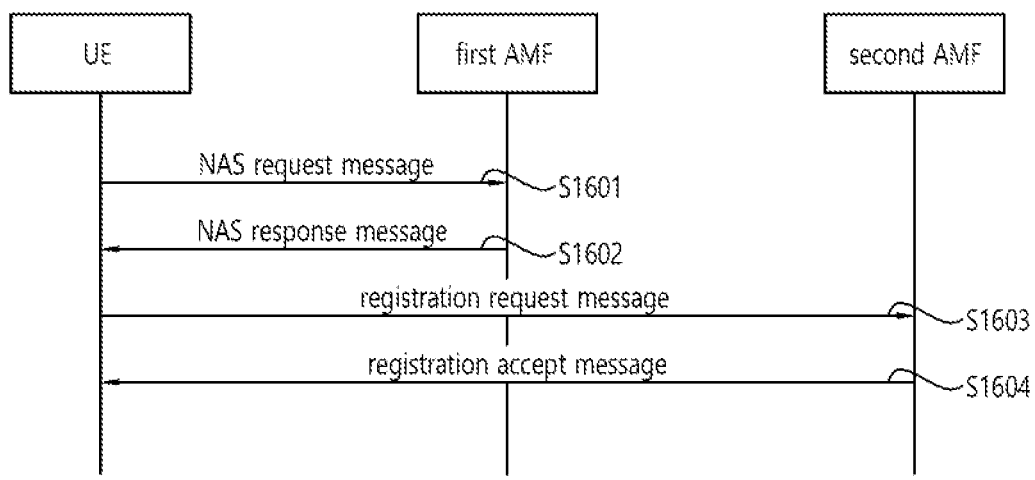
FIG. 16 shows an example of a procedure according to a fourth example of the disclosure of the present specification.

FIG. 16 shows an example of a procedure according to a fourth example of the disclosure of the present specification.

The example of FIG. 16 shows an example of operation of a terminal (e.g., UE) and/or a network (e.g., the AMF of the hosting network, the V-PCF of the hosting network, the ASUF of the home network, the UDM of the home network, the H-PCF of the home network, SMF of the hosting network, the AMF of the home network, the N3IWF of the home network) according to various examples of the disclosure of the present specification described above. For reference, the operation of the terminal and/or the operation of the network described in the example of FIG. 16 is merely an example, and the scope of the disclosure is not limited by the content described in the example of FIG. 16. For example, the terminal and/or the network may perform the operations described in the first to third examples of the disclosure above, even if not described in the example of FIG. 16.

For reference, although only the UE, the first AMF, and the second AMF are illustrated in the example of FIG. 16, this is an example for description. For example, the AMF of the hosting network, the V-PCF of the hosting network, the ASUF of the home network, the UDM of the home network, the H-PCF of the home network, SMF of the hosting network, the AMF of the home network, the N3IWF of the home network may also perform the operation described in the example of FIG. 16.

In step S1601, the UE may transmit a NAS request message to the first AMF. The NAS request message may include information for requesting localized service information.

In step S1602, the UE may receive a NAS response message from the first AMF. The NAS response message may include localized service information.

For reference, steps S1601 and S1602 may be performed in the same manner as in the example of FIG. 11.

In step S1603, the UE may transmit a registration request message to the second AMF. The registration request message may include registration type information. The registration type information may include information that the UE accesses the network for a localized service. For reference, the UE may notify registration for a localized service through a separate indication instead of registration type information.

In step S1604, the UE may receive a registration accept message from the second AMF. The registration accept message may include the LADN information related to the localized service.

In addition to the operations illustrated in the example of FIG. 16, the UE and the network may perform various examples of operations described above with reference to FIGS. 8 to 15.

According to an embodiment of the present disclosure, a terminal can dynamically discover a service provided in a specific area and receive the corresponding service without a separate subscription procedure. For example, the terminal does not need to know in advance information about the localized service provided by the NPN or subscribe to the NPN, the terminal can dynamically discover services provided in a specific area and receive the corresponding service without a separate subscription procedure.

According to one embodiment of the disclosure of the present specification, considering the slice information that the terminal wants to use, it can support the terminal to use the desired slice. For example, if necessary, by performing redirection to a non-3GPP access node supporting the corresponding slice, the terminal may support the desired slice to be used.

According to one embodiment of the disclosure of the present specification, while the terminal performs the registration procedure, the terminal may inform the AMF that it is a registration procedure for a localized service, by using the indication/registration type indicating that the terminal is a localized service, According to an embodiment of the present disclosure, the AMF may transmit LADN information to the terminal based on localized service indication/registration type information transmitted by the terminal.

According to one embodiment of the disclosure of the present specification, when the terminal performs the registration procedure for localized service indication, the AMF may inform the PCF that the UE registers for the localized service while creating the UE Policy Association.

According to an embodiment of the present disclosure, in the process of creating the UE Policy Association, the PCF of the hosting network may know that the terminal registers for a localized service. In this case, the PCF of the hosting network may transmit information about the localized service configured in the PCF of the hosting network to the PCF of the home network.

According to one embodiment of the disclosure of the present specification, based on the information about the localized service received from the hosting network PCF, a home network PCF may generate a URSP rule and transmit the updated URSP rule to the terminal.

For reference, the operation of the terminal (e.g., UE) described in this specification may be implemented by the apparatuses of FIGS. 1 to 4 described above. For example, the terminal (e.g., UE) may be the first device 100 or the second device 200 of FIG. 2. For example, an operation of a terminal (e.g., UE) described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 control one or more memories 104 or 204 and one or more transceivers 105 or 206, execute instructions/programs stored in one or more memories 104 or 204 as disclosed herein, such that the one or more processors 102 or 202 may perform the operation of the UE (e.g., UE) described in the disclosure of the present specification.

In addition, instructions for performing an operation of a terminal (e.g., UE) described in the disclosure of the present specification may be stored in a non-volatile computer-readable storage medium in which it is recorded. The storage medium may be included in one or more memories 104 or 204. In addition, the instructions recorded in the storage medium may be executed by one or more processors 102 or 202 to perform operations of a terminal (e.g., UE, UE-to-Network Relay) described in the disclosure of the present specification.

For reference, the operation of a network node (e.g., AMF in Hosting Network, V-PCF in Hosting Network, ASUF in Home Network, UDM in Home Network, H-PCF in Home Network, SMF in Hosting Network, AMF in Home Network, N3IWF in Home Network, etc.) or base station (e.g., NG-RAN, gNB, eNB, RAN, E-UTRAN, etc.) described herein may be implemented by the apparatus of FIGS. 1 to 3 to be described below. For example, a network node or a base station may be the first device 100a of FIG. 1 or the second device 100b of FIG. 1. For example, the operation of a network node or base station described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 may perform the operation of a network node or a base station described herein, by controlling one or more memories 104 or 204 and one or more transceivers 106 or 206 and executing instructions/programs stored in one or more memories 104 or 204.

In addition, instructions for performing the operation of the network node or base station described in the disclosure of this specification may be stored in a non-volatile (or non-transitory) computer-readable storage medium. The storage medium may be included in one or more memories 104 or 204. And, the instructions recorded in the storage medium are executed by one or more processors 102 or 202, so that the operations of a network node or base station are performed.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method performed by a device and comprising:
   transmitting a request message to an access management node of a public land mobile network;
   receiving a response message from the access management node of the public land mobile network;
   transmitting a registration request message to an access management node of a non-public network providing access to a localized service; and
   receiving a registration accept message from the access management node of the non-public network,
   wherein the request message includes a request for localized service information,
   wherein the response message includes the localized service information including hosting network information for the localized service, a time validity condition and a spatial validity condition,
   wherein the non-public network providing access to the localized service is selected based on the hosting network information, and
   wherein the registration request message is transmitted based on both the time validity condition and the spatial validity condition being satisfied.

2. The method of claim 1,
   wherein the registration accept message includes Local Area Data Network (LADN) information.

3. The method of claim 2, further comprising:
transmitting a PDU session establishment request message including the LADN information to the access management node of the non-public network to establish a PDU session related to the localized service; and
receiving a PDU session establishment accept message from the access management node of the non-public network.

4. The method of claim 3,
wherein, when the time validity condition and the spatial validity condition are satisfied, the PDU session establishment request message is transmitted.

5. A User Equipment (UE) comprising:
at least one processor; and
at least one memory for storing instructions and operably electrically connectable with the at least one processor;
wherein the operations performed based on execution of the instructions by the at least one processor include:
transmitting a request message to an access management node of a public land mobile network;
receiving a response message from the access management node of the public land mobile network;
transmitting a registration request message to an access management node of a non-public network providing access to a localized service; and
receiving a registration accept message from the access management node of the non-public network,
wherein the request message includes a request for localized service information,
wherein the response message includes the localized service information including hosting network information for the localized service, a time validity condition and a spatial validity condition,
wherein the non-public network providing access to the localized service is selected based on the hosting network information, and
wherein the registration request message is transmitted based on both the time validity condition and the spatial validity condition being satisfied.

6. The UE of claim 5, wherein the UE is an autonomous driving device communicating with at least one of a mobile terminal, a network and an autonomous vehicle other than the UE.

7. A method comprising:
receiving a request message from a User Equipment (UE); and
transmitting a response message to the UE,
wherein the request message includes a request for localized service information,
wherein the response message includes the localized service information including hosting network information for a localized service, a time validity condition and a spatial validity condition,
wherein the hosting network information is for selecting a non-public network providing access to the localized service, and
wherein the time validity condition and the spatial validity condition are for transmitting a registration request message to an access management node of the non-public network providing access to the localized service.

8. The method of claim 7, further comprising:
based on the request for the localized service information, transmitting a message including information that the UE accesses for the localized service to Unified Data Management (UDM).

9. The method of claim 8,
wherein the information that the UE accesses for the localized service is used by the UDM to determine whether to accept a registration of the UE.

* * * * *